US008942694B2

(12) United States Patent
Woo

(10) Patent No.: US 8,942,694 B2
(45) Date of Patent: Jan. 27, 2015

(54) DIGITAL DEVICE CONTROL SYSTEM USING SMART PHONE

(75) Inventor: In Koo Woo, Gumi-si (KR)

(73) Assignees: Digience Co., Ltd., Gumi-si, Gyeongbuk (KR); Woo, In Koo, Gumi-si, Gyeongbuk (KR)

( * ) Notice: Subject to any disclaimer, the term of this patent is extended or adjusted under 35 U.S.C. 154(b) by 3 days.

(21) Appl. No.: 13/823,515

(22) PCT Filed: Sep. 15, 2011

(86) PCT No.: PCT/KR2011/006798
§ 371 (c)(1),
(2), (4) Date: Mar. 14, 2013

(87) PCT Pub. No.: WO2012/036475
PCT Pub. Date: Mar. 22, 2012

(65) Prior Publication Data
US 2013/0171981 A1    Jul. 4, 2013

(30) Foreign Application Priority Data

Sep. 17, 2010  (KR) .................. 10-2010-0091628
Mar. 21, 2011  (KR) .................. 10-2011-0024780
Aug. 24, 2011  (KR) .................. 10-2011-0084503

(51) Int. Cl.
*H04M 3/00* (2006.01)
*G08C 17/02* (2006.01)
*G08C 23/04* (2006.01)
*H04L 12/12* (2006.01)
*H04L 12/40* (2006.01)

(52) U.S. Cl.
CPC ............... *G08C 17/02* (2013.01); *G08C 23/04* (2013.01); *H04L 12/12* (2013.01); *H04L 12/40013* (2013.01); *G08C 2201/40* (2013.01); *Y02B 60/34* (2013.01); *G08C 2201/93* (2013.01)
USPC ........... 455/420; 455/418; 455/419; 455/41.1

(58) Field of Classification Search
None
See application file for complete search history.

(56) References Cited

U.S. PATENT DOCUMENTS

2011/0223899 A1*  9/2011  Hiraide ..................... 455/420
2012/0146918 A1*  6/2012  Kreiner et al. ............ 345/173

FOREIGN PATENT DOCUMENTS

CN        202750149 U  *  2/2013
KR        1020030027920 A    4/2003
KR        1020030091070 A   12/2003
(Continued)

Primary Examiner — Erika A Washington
(74) Attorney, Agent, or Firm — Lucas & Mercanti, LLC

(57) ABSTRACT

There is provided a digital device control system using a smart phone, including a smart phone having an application of a remote control function, a digital device of which on/off of a power supply, channel or volume is controlled according to a signal received from the smart phone, and an IR repeater functioning as a central control unit connected to the smart phone through Bluetooth or Wi-Fi communication and connected to the digital device through a plurality of infrared ray communications in order to remotely control the digital device, and therefore, the digital device can be controlled using the smart phone instead of a remote controller. In addition, since a plurality of LEDs capable of performing infrared ray communication is included in the IR repeater so as to transmit and receive an infrared signal of a wide range, a digital device desired to be controlled can be remotely controlled even when the digital device is placed at a far distance or at a blind spot in a room, and a plurality of digital devices can be controlled simultaneously.

20 Claims, 22 Drawing Sheets

(56) References Cited

FOREIGN PATENT DOCUMENTS

| | | | |
|---|---|---|---|
| KR | 1020040104871 A | 12/2004 |
| KR | 1020060016649 A | 2/2006 |
| KR | 1020060016714 A | 2/2006 |
| KR | 1020060121476 A | 11/2006 |

* cited by examiner

DIGITAL DEVICE CONTROL SYSTEM USING SMART PHONE

CROSS-REFERENCE TO RELATED APPLICATIONS

This application is a 371 of PCT/KR2011/006798, filed Sep. 15, 2011, which claims the benefit of KR/10-2010-0091628 filed Sep. 17, 2010; KR/10-2011-0024780 filed Mar. 21, 2011, and KR/10-2011-0084503 flied Aug. 24, 2011, the contents of each of which are incorporated herein by reference.

TECHNICAL FIELD

The present invention relates to a digital device control system using a smart phone, and more specifically, to a digital device control system using a smart phone, in which an application of the smart phone recognizes a drag or a touch on a screen or a voice and transmits a signal to an IR repeater through Bluetooth or Wi-Fi communication so that volume control, channel switch and power on and off of various kinds of digital devices may be remotely controlled.

In addition, the present invention relates to a digital device control system using a smart phone, in which if a learning signal reception unit provided in an IR repeater receives an infrared signal transmitted from a remote controller, which is a remote control device for controlling a digital device, and then a microcomputer captures and transmits the received infrared signal to the smart phone through a wireless communication unit, an infrared signal learning unit provided in the smart phone stores the infrared signal in a form as is received by the microcomputer and teaches the infrared signal to the smart phone and the IR repeater, and thus the smart phone and the IR repeater may easily learn the infrared signal unique to the digital device and created by the remote control device which configures a pair with the digital device.

In addition, the present invention relates to a digital device control system using a smart phone, in which if a relay home server installed in each home receives a driving signal of a digital device transmitted from inside or outside of a room through the smart phone and transmits the digital device driving signal to an IR repeater which is provided with an infrared ray generation means, the IR repeater receiving the digital device driving signal creates and transmits an infrared signal, and thus a user may easily control the digital device in the home when the user is outside as well as inside of the room. Furthermore, if the IR repeater receives and captures the infrared signal transmitted from a remote control device such as a remote controller and transmits the captured infrared signal to the smart phone, the smart phone analyzes a pattern of the captured infrared signal, compresses and transmits data included in the infrared signal to the IR repeater and stores the data, and thus the smart phone and the IR repeater may easily learn an infrared signal unique to a new digital device.

BACKGROUND ART

Most of electronic products, particularly, TVs or the like, use a remote controller so that a user may control the electronic products while sitting on a sofa or the like without directly pressing various function buttons attached to the main body, such as buttons for volume control, channel switch, power on/off or the like.

However, the remote controller should be used within a predetermine distance since its output power is low, and if there is an obstacle, an infrared remote controller may not be in effect since infrared rays may not arrive at the electronic product by the nature of light.

In addition, although the remote controller should be placed near the electronic product to be used at any time, if the remote controller is placed at a position where the electronic product is not installed or the remote controller is dropped down under a sofa and could not be found, the user may suffer from inconvenience of directly handling the electronic product. However, since most of families do not prepare an extra remote controller, a user should bear the inconvenience of directly handling the electronic product if he or she does not find the remote controller momentarily.

In order to solve the problems described above, a prior art devised to allow a user to use a remote control function in a cellular phone is disclosed in Korean Laid-open Utility Model No. 2000-0001257, in which a remote control transmission unit for transmitting a certain optical signal is provided at the output port of the microcomputer of the cellular phone, and a remote control function selection key is additionally provided in an key input unit.

FIG. 1 is a circuit block diagram showing a cellular phone having a remote control function according to the prior art.

A cellular phone having a remote control function according to the prior art includes a wireless transmission unit 1 for transmitting a voice data as an RF signal, a wireless reception unit 2 for receiving an RF voice signal, a microcomputer 3 connected to the wireless transmission unit 1 and the wireless reception unit 2, for controlling each device in the cellular phone, a key input unit for inputting various key data by a user, a display unit 4 for displaying various kinds of display information under the control of the microcomputer 3, and a remote control transmission unit 6 having a light emitting means for transmitting a corresponding optical signal when the user selects a variety of function keys while pressing a remote control function selection key 5 on the key input unit.

Although the cellular phone having a remote control function according to the prior art includes the remote control function therein, it is inappropriate as a today's cellular phone, which tends to be miniaturized and light weighted, since devices such as the remote control function selection key, the remote control transmission unit and the like are added.

In addition, although digital devices that can be handled using a remote controller, i.e., a remote control device, and improve convenience of use are limited to TVs, audio systems and the like in the past, in which channel switch and volume control are frequently needed, its application is extended recently to various digital devices such as cooling and heating facilities including an air conditioner, an electric fans or the like, DVD players, lighting equipments and the like.

However, although the remote controller should be always kept near the digital device in order to handle the digital device using the remote controller, unlike a remote controller which is always put on a sofa or the like in front of a TV since a place for watching the TV is limited to the front of the TV, a remote controller for another type of digital device is not placed at a specific position, and a user frequently looks for the remote controller to handle the digital device.

In addition, as the types and functions of digital devices handled by a remote controller increase, handling keys and interfaces of each remote controller are diversified and complicated, and thus users may not sufficiently utilize all the functions provided in the remote controller.

In addition, it is general that the remote controller transmits an infrared signal formed in a binary code including a custom code for identifying a manufacturer and a digital device to be controlled and a data code which is a control command, and only a specific digital device may recognize the infrared signal and control a relevant function.

Accordingly, it is general in the prior art that an infrared signal is created and transmitted in a method unique to a manufacturer using a binary signal of different time and length, i.e., by varying length of a high or low pulse for information coding, so as to identify a digital device from a variety of digital devices and create a control command for the digital device based on a simple binary code.

In addition, even in the products manufactured by the same manufacturer, a different custom code is assigned to each digital device in order to prevent malfunctions occurred due to confusions among control commands. Therefore, since a variety of digital devices manufactured by a large number of manufacturers respectively have a custom code different from the others, digital codes used for remote controllers are configured quite diversely.

Accordingly, universe remote controllers are proposed recently, in which all domestic and foreign manufacturers and custom codes of all digital devices sold by the manufacturers are stored in advance, and a custom code matched to a custom code included in an infrared signal actually transmitted from a remote controller is extracted and stored to be used as a custom code of a corresponding digital device.

However, such a universe remote controller of the prior art has a problem in that it is practically impossible to store all the custom codes in advance for all the products newly released in recent days, and it is considerably inconvenient to search for and extract a matched custom code.

Furthermore, the universe remote controllers of the prior art also have limitations of a remote controller itself in that a digital device should be handled by transmitting an infrared signal in front of the digital device, and inconvenience of paying attention to keeping the remote controller still remains.

In addition, although a cellular phone including a remote controller has been proposed in the prior art based on the idea that the cellular phone is placed nearby at all times, there are not so many digital devices that can be operated using the remote controller, and a remote controller interface displayed on the cellular phone is quite simple in many cases so as to allow only simple handlings using a keypad, and thus it is not used very much, and a plenty of space should be secured in the cellular phone in order to install an infrared ray generation unit. Therefore, it is general that recently manufactured cellular phones, i.e., smart phones, are released excluding the infrared ray generation unit.

Accordingly, although an apparatus for combining a separate infrared ray generation apparatus with a smart phone is proposed recently so that a smart phone released excluding the infrared ray generation unit may be used as a remote controller, there is a problem in that it is troublesome to carry the infrared ray generation apparatus at all times and use the infrared generation apparatus in combination with the smart phone.

In addition, recently, the need of controlling on/off of digital devices, such as a plurality of electronic products placed inside of a home, even when a user is outside as well as inside of a room is increased, and to this end, it is tried further more to construct home automation within a home based on a ubiquitous environment. However, there is a problem in that the home automation based on a ubiquitous environment is restrictedly used only for newly constructed luxury houses, not actively used for existing general houses, since too much cost is required to construct the system, and in addition, a work or the like for constructing the system is troublesome.

DISCLOSURE OF INVENTION

Technical Problem

Therefore, the present invention has been made in view of the above problems, and it is an object of the present invention to provide a digital device control system using a smart phone, in which the smart phone may function as a remote controller so as to control a selected digital device.

Another object of the present invention is to provide a digital device control system using a smart phone, in which an IR repeater functioning as a relay between the smart phone and a digital device includes both a communication unit and an infrared ray transmission and reception unit to be connected to the smart phone through Bluetooth or Wi-Fi communication and to the digital device through infrared ray communication so as to remotely control the digital device.

Still another object of the present invention is to provide a digital device control system using a smart phone, in which since a plurality of LEDs capable of performing infrared ray communication is included in the IR repeater so as to transmit and receive an infrared signal of a wide range, a digital device desired to be controlled can be remotely controlled even when the digital device is placed at a far distance or at a blind spot in a room, and a plurality of digital devices can be controlled simultaneously.

In addition, the present invention provides a digital device control system using a smart phone capable of learning an infrared signal of a digital device, in which if a learning signal reception unit provided in an IR repeater receives the infrared signal transmitted from a remote control device for controlling the digital device and then a microcomputer captures and transmits the received infrared signal to the smart phone through a wireless communication unit, an infrared signal learning unit provided in the smart phone stores the infrared signal in a form as is received by the microcomputer and teaches the infrared signal to the smart phone and the IR repeater, and thus the smart phone and the IR repeater may easily learn the infrared signal unique to the digital device and created by the remote control device which configures a pair with the digital device.

In addition, the present invention provides a digital device control system using a smart phone, in which if a relay home server installed in each home receives a driving signal of a digital device transmitted from inside or outside of a room through the smart phone and transmits the digital device driving signal to an IR repeater which is provided with an infrared ray generation means, the IR repeater receiving the digital device driving signal creates and transmits an infrared signal, and thus a user may easily control the digital device in the home when the user is outside as well as inside of the room. Furthermore, if the IR repeater receives and captures the infrared signal transmitted from a remote control device such as a remote controller and transmits the captured infrared signal to the smart phone, the smart phone analyzes a pattern of the captured infrared signal, compresses and transmits data included in the infrared signal to the IR repeater and stores the data, and thus the smart phone and the IR repeater may easily learn an infrared signal unique to a new digital device.

Technical Solution

To accomplish the above objects, according to one aspect of the present invention, there is provided a digital device control system using a smart phone, the system including:

the smart phone having an application of a remote control function; a digital device of which on/off of a power supply, channel or volume is controlled according to an infrared signal; and an IR repeater functioning as a central control unit connected to the smart phone through Bluetooth or Wi-Fi communication and, if a signal of the smart phone is received, transmitting the infrared signal to the digital device, wherein the IR repeater includes:

a communication unit for wirelessly communicating with the smart phone through the Bluetooth or Wi-Fi communication; a code storage unit for storing information on an electronic product and a manufacturer corresponding to a custom code; a plurality of infrared ray transmission and reception units including a plurality of LEDs for expanding a transmission angle to a range of 60° to 360° and transmitting the infrared signal; and a microcomputer for controlling the digital device control system to separate and detect a custom code of the digital device included in the signal of the smart phone received through the communication unit, compare a custom code in the code storage unit with one custom code of the digital device, and transmit the infrared signal for controlling the digital device through the infrared ray transmission and reception unit if the custom codes are matched.

At this point, the smart phone includes:

a control unit functioning as a CPU for controlling operation of the smart phone as a whole; a memory unit for storing the custom code of the digital device desired to be controlled; a communication unit for performing the Bluetooth or Wi-Fi communication with the IR repeater; a screen display unit for displaying a manual for controlling the digital device on the smart phone; a motion recognition unit for recognizing a motion such as a touch or a drag on a screen of the smart phone; and a voice recognition unit for recognizing a voice of a user to control the digital device; wherein the control unit controls the screen display unit to provide the manual on the screen and transmits data received from the motion recognition unit and the voice recognition unit and the custom code to the IR repeater through the communication unit.

In addition, a digital device control system using a smart phone according to the present invention includes:

a remote control device provided together with the digital device, for transmitting a control command of a corresponding digital device as the infrared signal; an IR repeater provided with a microcomputer for receiving the infrared signal transmitted from the remote control device, capturing the infrared signal and transmitting the infrared signal to the smart phone through a wireless communication unit; the smart phone provided with an infrared signal learning unit for receiving the infrared signal transmitted from the IR repeater, matching the infrared signal to a corresponding control command, and storing the infrared signal, wherein the IR repeater includes:

a learning signal reception unit configured as an infrared ray receiver (IR_Receiver) being activated when the IR repeater is set to a learning mode and receiving the infrared signal transmitted from the remote control device; a microcomputer functioning as a control unit in charge of general control of the IR repeater and, in addition, capturing and storing the infrared signal as is received by the learning signal reception unit and transmitting the infrared signal to the smart phone; and a wireless communication unit configured as a communication module for transmitting and receiving data to and from the smart phone through a wireless communication network.

At this point, the microcomputer captures and transmits the infrared signal in a form as is integrating a plurality of codes, such as a lead code for activating a digital device desired to be controlled, a custom code which is an address for identifying the digital device, a data code which is a control command of the digital device, and an inverted data code ($\overline{Datacode}$) inverting the data code.

In addition, the IR repeater includes:

a driving signal reception unit for receiving a driving signal of a newly learned digital device transmitted from the smart phone, through the wireless communication unit; an infrared signal generation unit for creating an infrared signal corresponding to a custom code of the digital device and a data code, i.e., a control command, which configure the received driving signal; and an infrared signal transmission unit for transmitting the infrared signal toward the digital device.

In addition, the smart phone includes:

an integrated control driving unit for creating individual driving signals for controlling a plurality of digital devices by a user input; an infrared signal learning unit for receiving a captured infrared signal of a new digital device transmitted from the IR repeater in a form as is integrating the plurality of codes which configures the infrared signal; an infrared signal storage unit for matching the infrared signal to a control command of a digital device desired to be controlled by the corresponding infrared signal and storing the infrared signal; a driving signal creation unit for creating the driving signal of the digital device by handling an input unit displayed on a display means of the smart phone by the integrated control driving unit; and a transmitter communication unit capable of performing wireless communication with the IR repeater.

In addition, a digital device control system using a smart phone according to the present invention includes:

the smart phone including a driving signal creation unit for creating a driving signal for controlling a digital device by handling a button displayed on a display means by activating a digital device control application and a driving signal communication unit for transmitting the driving signal of the digital device created by the driving signal creation unit through a wireless communication unit; a relay home server for receiving the driving signal transmitted from the smart phone of outside and transmitting the driving signal to an IR repeater installed inside of a room; and the IR repeater including a driving signal reception unit for receiving the driving signal transmitted from the smart phone or the relay home server, an infrared signal generation unit for generating an infrared signal corresponding to a custom code and a control command of the digital device, which configure the received driving signal, an infrared signal transmission unit for transmitting the infrared signal toward the digital device, and a wireless communication unit formed as a gateway for receiving the driving signal.

At this point, the relay home server includes a smart phone communication unit configured as a Wi-Fi module for receiving the driving signal transmitted from the smart phone placed outside and a repeater communication unit for transmitting the driving signal received from the smart phone to the IR repeater placed inside.

In addition, the digital device control system according to the present invention further includes a format server including:

a smart phone authentication unit for validating an access right to a format database by authenticating a user connected through a wireless communication network; the format database for storing remote controller formats of digital devices provided by domestic and foreign manufacturers or user interfaces uploaded by users who learn infrared signals and create the user interfaces; and a format transmission unit for transmitting a remote controller format and a user interface selected by the user to the smart phone of the authenticated user.

At this point, the smart phone further includes:

an infrared signal learning unit for receiving and storing an infrared signal of a new digital device transmitted from the IR repeater; and a UI setting unit for forming an interface of a smart phone user for handling a function of a newly learned infrared signal, matching a function of a control command to each of buttons configuring the interface of the user, and storing the interface, and the IR repeater further includes:

a learning signal reception unit for receiving an infrared signal transmitted from a remote control device of a new digital device; and a microcomputer for capturing and transmitting the infrared signal received by the learning signal reception unit to the smart phone and receiving and storing an infrared signal transmitted from the smart phone.

In addition, the smart phone further includes a format download unit connected to the format server on the wireless communication network so as to upload an infrared signal pattern of a digital device which is learned and analyzed through the infrared signal learning unit onto the format server through the wireless communication network and download a remote controller format previously uploaded by another user or a digital device manufacturer from the format server.

Advantageous Effects

As described above, the digital device control system using a smart phone according to the present invention is effective in that an IR repeater, which is connected to the smart phone through Bluetooth or Wi-Fi communication and connected to a digital device through infrared ray communication in order to remotely control the digital device, forms a plurality of infrared ray transmission and reception units so that an angle of 60° for transmitting infrared LED signals in the prior art may be expanded to transmit and receive infrared signals in a range up to 360°, and thus the digital device can be controlled wherever it is placed (including a far distance or a blind spot in a room), and a plurality of digital devices can be controlled simultaneously.

In addition, since the smart phone may connect to the Internet or a PC through Bluetooth or Wi-Fi communication, an application of the smart phone may connect to the Internet or the PC through the Bluetooth or Wi-Fi communication and remotely control a digital device desired to be controlled by transmitting a data signal of the digital device to the IR repeater, and thus a user may remotely control the digital device regardless of time and space although the user is at a position close to or far from the IR repeater.

In addition, since a smart phone can be used as a remote controller, an extra remote controller does not need to be prepared, and thus the cost thereof can be saved. In addition, power ON/OFF, channel and volume of a digital device can be easily controlled by dragging or touching a screen unit of the smart phone or recognizing a voice from the smart phone. Since the smart phone may connect to the Internet at any time and place, software required for the digital device can be easily downloaded, and a newly added digital device can be easily controlled without an additional program or equipment.

In addition, the present invention is advantageous in that since an infrared signal transmitted from a remote control device which controls a digital device is captured in a form as is integrating a plurality of codes including a custom code and stored in the smart phone and the IR repeater, an infrared signal of a new digital device can be easily added and learned, and a plurality of digital devices may be easily controlled using the infrared signal that is newly learned as described.

In addition, the present invention is advantageous in that a digital device in a home can be easily controlled when a user is outside as well as inside of a room, and since a pattern of an infrared signal formed in a new remote controller format for remote controlling a new digital device is analyzed and the infrared signal is stored in the smart phone and the IR repeater, the infrared signal unique to the new digital device can be easily learned and used.

In addition, the present invention is advantageous in that since a Bluetooth module or a Wi-Fi module is installed in an IR repeater in which infrared LEDs are installed in a radial pattern, and a relay home server configured of a personal computer and the like located in a home receives a driving signal transmitted directly from a smart phone or from a smart phone placed outside of a room through a 3G network or Wi-Fi communication and transmits the driving signal to the IR repeater thorough a local network such as Bluetooth or Wi-Fi communication, which forms a local area network within the home, in order to control a digital device, stable home automation may be implemented at a low cost.

BEST MODE FOR CARRYING OUT THE INVENTION

Hereinafter, a preferred first embodiment of a digital device control system using a smart phone according to the present invention will be described in detail with reference to the accompanying drawings.

Figure 1:
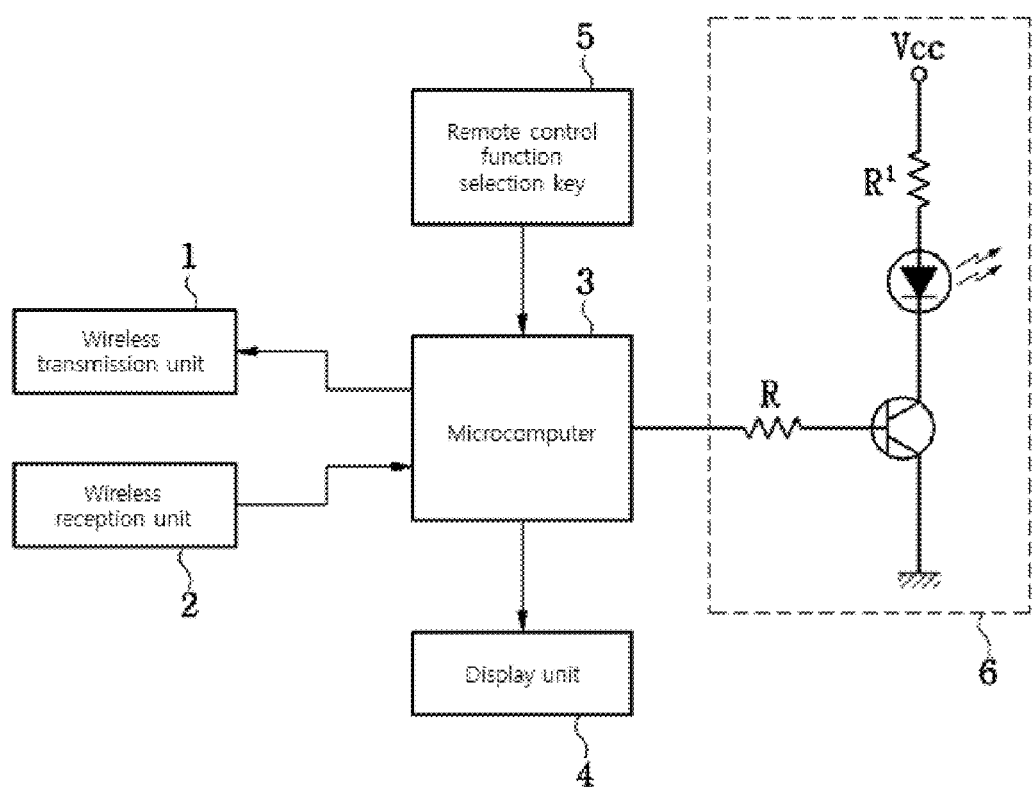
FIG. 1 is a circuit block diagram showing a cellular phone having a remote control function according to the prior art.
Figure 2:
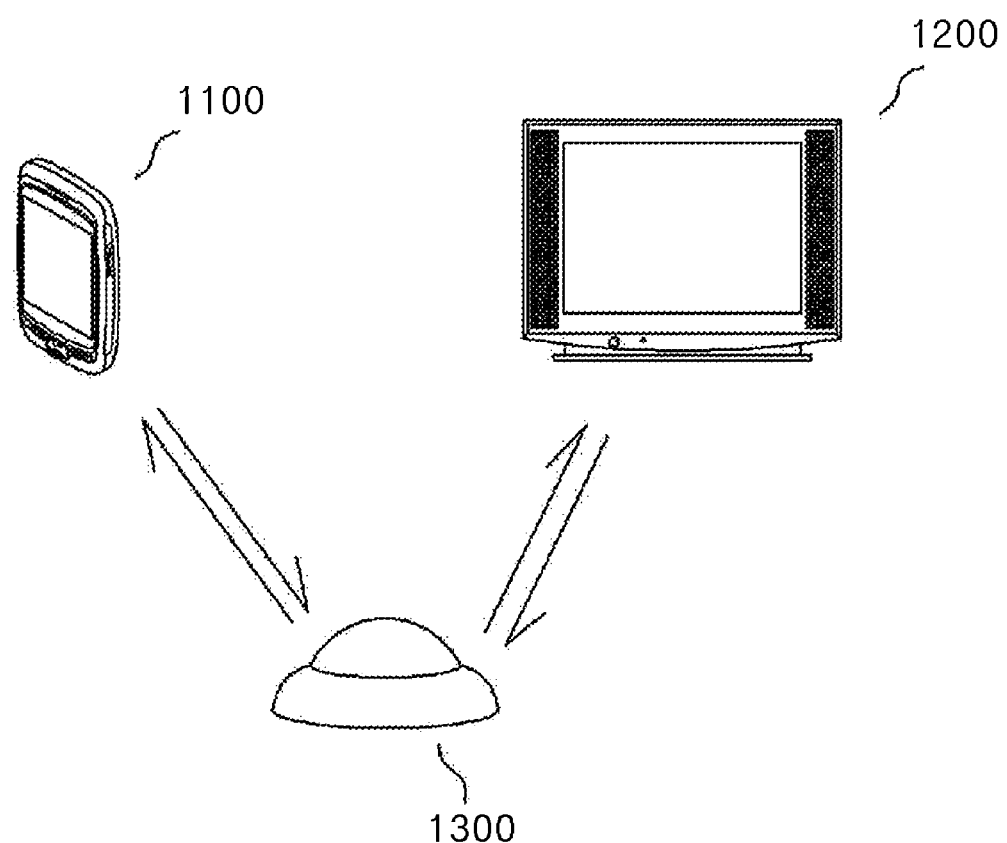
FIG. 2 is a configuration view showing a first embodiment of a digital device control system using a smart phone according to the present invention.
Figure 3:
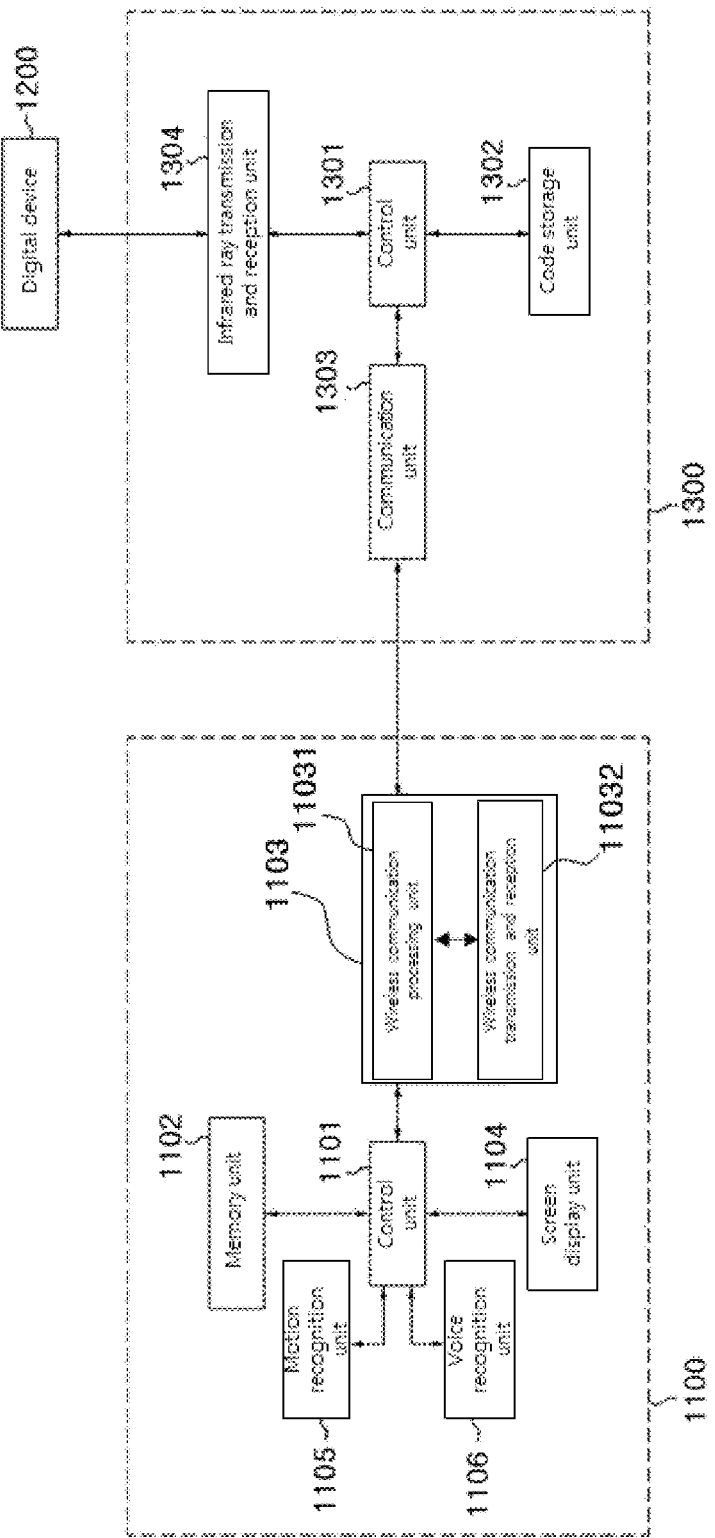
FIG. 3 is a block diagram showing a first embodiment of a digital device control system using a smart phone according to the present invention.
Figure 4:
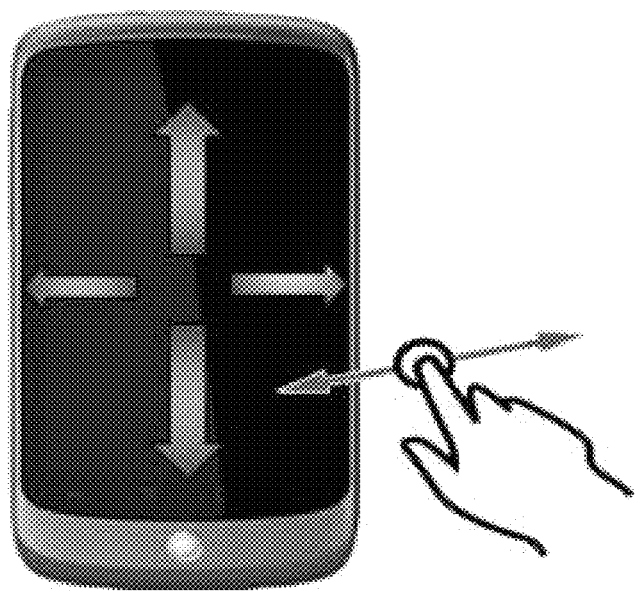
FIGS. 4 to 6 are plan views showing a method of using a smart phone according to the present invention.
Figure 5:
Figure 6:
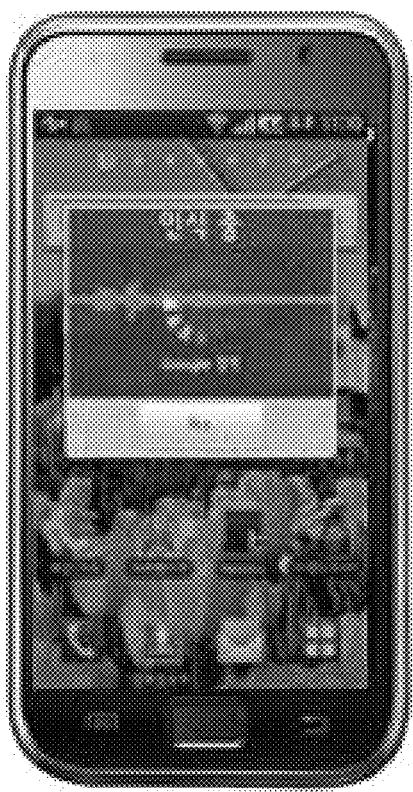

FIG. 2 is a configuration view showing a first embodiment of a digital device control system using a smart phone according to the present invention, FIG. 3 is a block diagram showing a first embodiment of a digital device control system using a smart phone according to the present invention, and FIGS. 4 to 6 are plan views showing a method of using a smart phone according to the present invention.

Describing a first embodiment of the present invention with reference to FIGS. 2 and 3, a digital device control system using a smart phone includes the smart phone 1100 having an application of a remote control function, a digital device 1200 of which on/off of a power supply, channel or volume is controlled according to a signal received from the smart phone 1200, and an IR repeater 1300 functioning as a central control unit connected to the smart phone 1100 through Bluetooth or Wi-Fi communication and connected to the digital device 1200 through a plurality of infrared ray communications in order to remotely control the digital device 1200.

The smart phone 1100 combines advantages of a cellular phone and a personal digital assistant (PDA) by integrating a data communication function such as facsimile transmission and reception, Internet connection or the like with the functions of the cellular phone. The most outstanding feature thereof is the capability of installing, adding or deleting hundreds kinds of diverse applications (application programs) as a user desires, unlike an existing cellular phone which is released as a complete product and uses only predetermined functions.

The present invention is to control various kinds of digital devices 1200 using the smart phone 1100, and as shown in FIG. 3, the smart phone 1100 includes a control unit 1101 functioning as a CPU for controlling operation of the smart phone 1100 as a whole, a memory unit 1102 for storing a custom code of a digital device desired to be controlled, a communication unit 1103 for performing wireless communication with the IR repeater 1300 or a PC (not shown), a screen display unit 1104 for displaying a manual for controlling the digital device 1200 on the smart phone 1100, a motion recognition unit 1105 for recognizing a motion such as a touch or a drag on a screen of the smart phone 1100, and a voice recognition unit 1106 for recognizing a voice of a user to control the digital device 1200.

The control unit 1101 is a device for controlling overall operation of the smart phone, which processes and controls voice communication and data communication.

The memory unit 1102 may be configured as ROM, RAM, flash ROM or the like, and the ROM (Read Only Memory) stores a micro code of a program for performing the process and control of the control unit 1101 and various kinds of reference data. The RAM (Random Access Memory) is a working memory of the control unit 1101, for storing temporary data created while various kinds of programs are executed, and the flash ROM stores various kinds of updatable storage data such as document data or the like. Particularly, in the present invention, the flash ROM is formed to store custom codes of digital devices released by domestic or foreign electronics companies, and if a custom code is not stored when a smart phone is released by a mobile communication company, a custom code of a new digital device can be added or updated by connecting to a server of each electronics company and downloading a needed program through the Bluetooth or Wi-Fi communication function of the smart phone 1100.

The communication unit 1103 is a device for performing transmission and reception of wireless signals input and output through an antenna and includes a wireless communication processing unit 11031 and a wireless communication transmission and reception unit 11032.

The wireless communication processing unit 11031 is a device for interfacing the wireless communication transmission and reception unit 11032 and the control unit 1101, which encodes and transmits a signal input from the control unit 1101 to the wireless communication transmission and reception unit 11032 and decodes and outputs a signal received from the wireless communication transmission and reception unit 11032 to the control unit 1101.

The wireless communication transmission and reception unit 11032 receives a signal converted by the wireless communication processing unit 11031 and transmits the signal through Bluetooth, IrDA (Infrared Data Association), or Wi-Fi (Wireless-Fidelity) communication, and transmits a signal received through the wireless communication to the wireless communication processing unit 11031.

As shown in FIG. 5, the screen display unit 1104 displays a manual which shows a device name, channel and voice control keys, numeric input keys and the like of a selected digital device through a screen of the smart phone 1100.

The motion recognition unit 1105 is provided with a plurality of function keys such as numeric keys, menu keys, a cancel key, a confirm key, a turn-off key and the like and provides the control unit 1101 with data input through a touch or a drag of a user.

The voice recognition unit 1106 converts a voice signal received through a microphone into a digital data and provides the control unit 1101 with the digital data, and the data provided through Bluetooth or Wi-Fi communication via the communication unit 1103 may be used to control the digital device 1200 desired to be controlled.

Meanwhile, FIGS. 4 to 6 show a method of controlling a digital device 1200. The surface of the screen is dragged back and forth, and left and right, and it is recognized whether the drag is a channel control or a volume control through the motion recognition unit 1105, and a signal is transmitted to the IR repeater 1300 through the communication unit 1103. In FIG. 5, a digital device can be controlled through the motion recognition unit 1105 by touching the screen according to the manual displayed on the screen through the screen display unit 1104. In FIG. 6, an input voice of a user is analyzed and compared with a data stored in the voice recognition unit 1106, and the digital device 1200 can be controlled by transmitting a signal to the IR repeater 1300 through the communication unit 1103 only when the voice and the data are matched.

The digital device 1200 is an electronic product such as a TV, a VCR, an audio system or the like manufactured by a domestic or foreign electronics company, and since the digital device 1200 is released together with a manual which guides control codes and operations of each product type, power ON/OFF, channel switch, volume control or the like may be controlled by transmitting and receiving an infrared signal to and from the IR repeater 1300 described below. Since the digital device 1200 is generally available in the market and is not a core technical configuration of the present invention, details thereof will not be described.

The IR repeater 1300 includes a microcomputer 1301 for separating and extracting a custom code included in a signal received from the smart phone 1100 and searching for a unique custom code number corresponding to the custom code when a custom code search mode is set, a code storage unit 1302 for receiving a code of a digital device stored in the memory unit 1102 of the smart phone 1100 and, at the same time, storing information on an electronic device and a maker corresponding to the custom code in the IR repeater 1300, a communication unit 1303 for communicating with the smart phone 1100 through wireless communication, and an infrared ray transmission and reception unit 1304 connected to the digital device 1200 through infrared ray communication.

If a code of a digital device 1200 selected from the smart phone 1100 is received through the communication unit 1303, the microcomputer 1301 analyses and compares the received code with a code of the digital device stored in the code storage unit 1302. If the received digital device code matches the code stored in the code storage unit 1302, the selected digital device can be controlled, whereas if a code that is not stored in the code storage unit 1302 is received, the microcomputer 1302 analyzes the code and stores the newly received code in the code storage unit 1302.

Meanwhile, the microcomputer 1301 includes a decoder (not shown) for decoding an encoded custom code based on information on the read custom code and restoring a result data of the custom code.

Accordingly, the decoder (not shown) analyzes the custom code input from the microcomputer 1031 and performs decoding, error detection and error correction on the data that is encoded for each code. Since the decoder has a decryption algorithm promised for a specific code, it may store thousands of codes and control all kinds of digital devices, prevent malicious use of an infrared receiver such as stealing a code, and upgrade the codes if needed.

In addition, the IR repeater 1300 forms a plurality of LEDs (not shown) for transmitting and receiving a signal through the infrared ray transmission and reception unit 1304 so that an angle of 60° for transmitting an infrared LED signal in the prior art may be expanded so as to transmit and receive the infrared signal in a range up to 360°, and thus a digital device can be controlled wherever it is placed, and a plurality of digital devices can be controlled simultaneously.

However, when a distance between the IR repeater 1300 and the digital device 1200 is too long or the digital device 1200 is positioned at a blind spot in a room, and thus the digital device 1200 cannot be controlled through the IR repeater 1300, a separate infrared repeater (not shown) may be additionally installed and used between the IR repeater 1300 and the digital device 1200.

Next, a digital device controlled according to a first embodiment of the digital device control system using a smart phone of the present invention will be described.

If the remote control function is selected from the screen of the smart phone 1100, custom codes of digital devices 1200 released by domestic and foreign electronics companies and stored in the memory unit 1102 when the smart phone 1100 is released are transmitted to the screen display unit 1104, and digital device names are displayed on the screen.

At this point, if the digital device 1200 desired to be controlled by a user is not included in the list, the smart phone may add a code of the newly manufactured product into the memory unit 1102 by connecting to a server of an electronics company through Wi-Fi or Bluetooth communication and downloading a needed program.

If the user desires to switch channels on a TV of S company, the user looks for the TV of S company from the list and touches the TV on the screen or speaks into the smart phone. Then, the motion recognition unit 1105 or the voice recognition unit 1106 of the smart phone 1100 senses a signal and transmits a code corresponding to the selected TV to the IR repeater 1300 in the form of a signal through the communication unit 1103. Then, the microcomputer 1301 of the IR repeater 1300 separates and detects a custom code included in the signal received from the smart phone 1100, searches for a unique custom code number corresponding to the custom code by comparing the custom code with the codes stored in the code storage unit 1302, and calls the selected TV of S company through the infrared ray transmission and reception unit 1304 to switch the channel.

In addition to simply controlling the channel or volume of a TV, the digital device control system using a smart phone according to the present invention forms a timer function, and if a desired time is set by an application of the smart phone, information on the set time is input into the IR repeater through Bluetooth or Wi-Fi communication, and the digital device may be turned ON/OFF at the desired time.

In addition, the digital device control system using a smart phone may remotely control a device having an infrared ray reception module, in addition to a TV, an audio system or the like, through the IR repeater using the smart phone, and since the smart phone is capable of connecting to the Internet or a PC through Bluetooth or Wi-Fi communication, if a user desires to remotely control a digital device located in a home even when the user is outside, he or she can remotely control the digital device by connecting to a PC using an application of the smart phone through Bluetooth or Wi-Fi communication and transmitting a signal to the IR repeater.

Next, a second embodiment of the digital device control system using a smart phone according to the present invention will be described with reference to the accompanying drawings. In the second embodiment, the smart phone and the IR repeater which learn and use an infrared signal including a custom code, a data code and the like will be described in detail.

Figure 7:
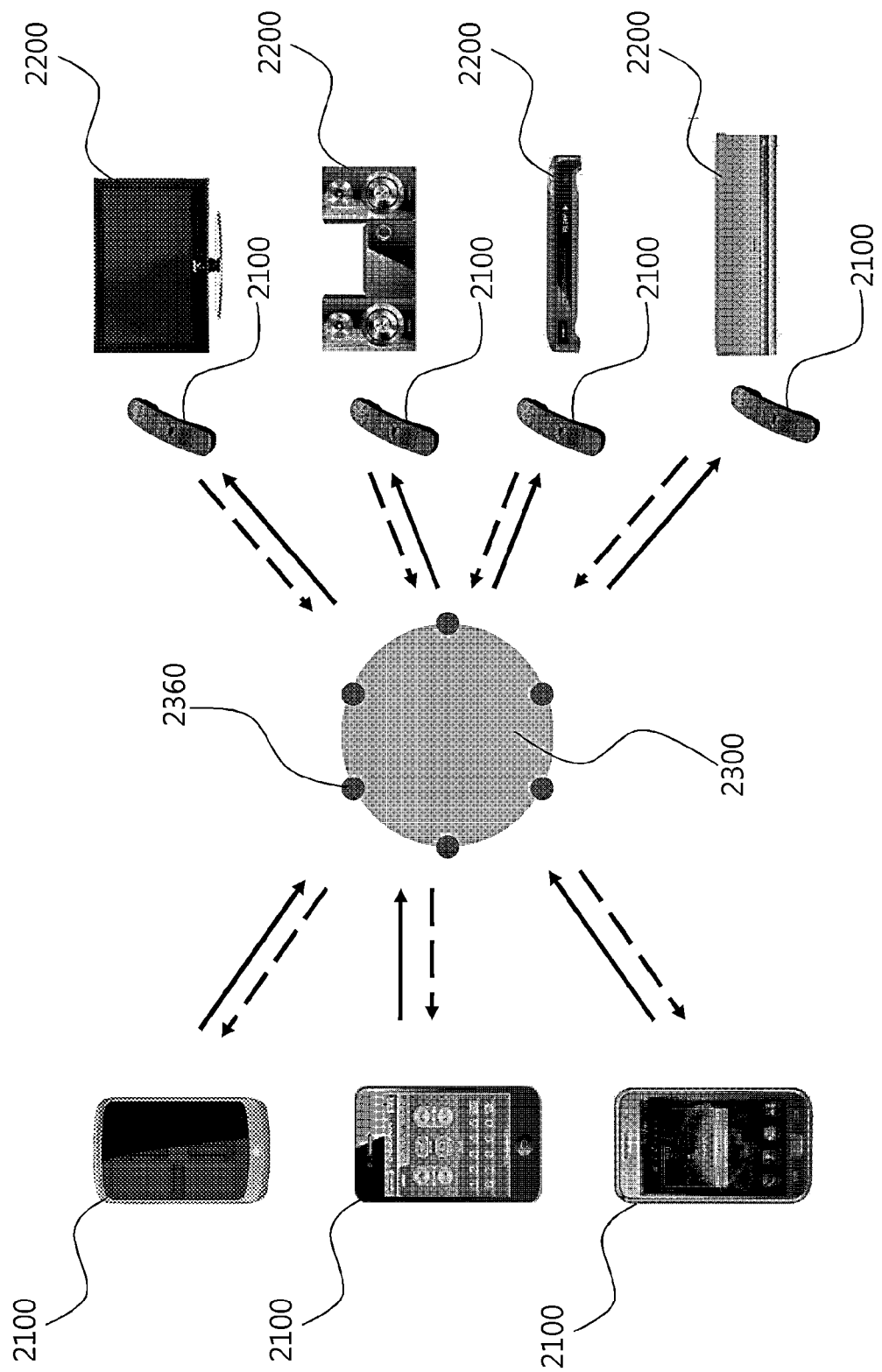
FIG. 7 is a configuration view schematically showing a second embodiment of a digital device control system using a smart phone according to the present invention.
Figure 8:
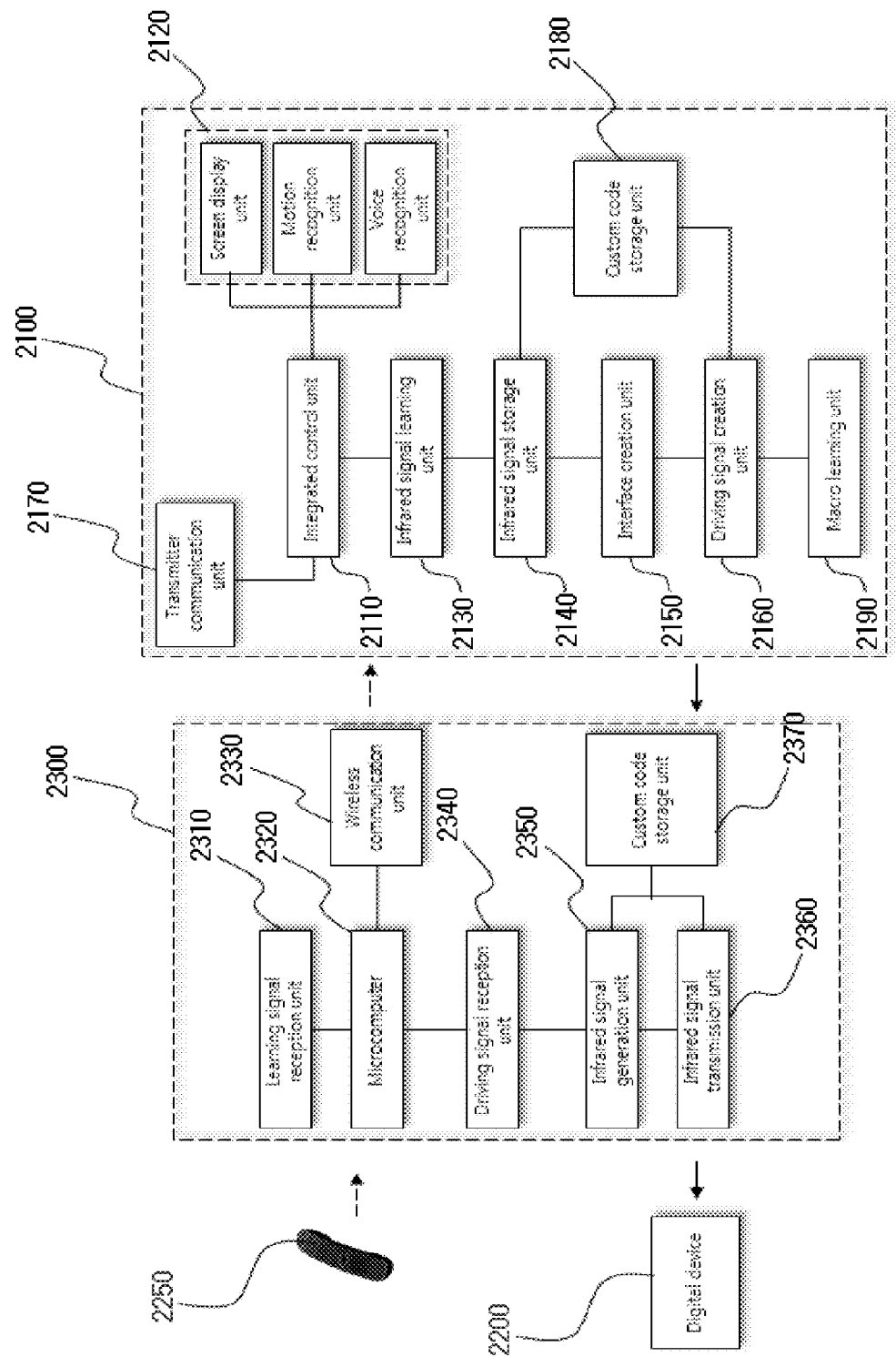
FIG. 8 is a block diagram showing a second embodiment of a digital device control system using a smart phone according to the present invention.

FIG. 7 is a configuration view schematically showing a second embodiment of a digital device control system using a smart phone according to the present invention, and FIG. 8 is a block diagram showing a second embodiment of a digital device control system using a smart phone according to the present invention. At this point, in FIGS. 7 and 8, transmission of data for infrared signal learning by a digital device is expressed as dotted lines, and transmission of data for controlling a digital device according to creation of a driving signal by the smart phone is expressed as solid lines.

Referring to FIG. 7, the second embodiment of a digital device control system using a smart phone capable of learning an infrared signal of a digital device according to the present invention includes a remote control device 2250 provided together with the digital device and set to a custom code the same as that of the digital device, an IR repeater 2300 for receiving an infrared signal transmitted from the remote control device and capturing and transmitting the infrared signal to the smart phone through the wireless communication unit, and the smart phone 2100 for receiving the infrared signal transmitted from the IR repeater, matching the infrared signal to a control command and storing the infrared signal.

At this point, after the IR repeater and the smart phone learn and store the infrared signal including a custom code of a new digital device, the smart phone 2100 creates a driving signal of the digital device selected by the handling of the user and transmits the driving signal through a wireless communication network, and the IR repeater 2300 receives the driving signal of the digital device transmitted from the smart phone and creates and transmits an infrared signal for driving the digital device.

As described above, since the infrared signal of a new digital device 2200 is stored in the smart phone 2100 which creates a driving signal by a user and in the IR repeater 2300 which receives the driving signal created by the smart phone and creates and transmits an infrared signal to the digital device, diverse digital devices can be conveniently handled using the smart phone and the IR repeater without a separate remote controller by executing a learning mode only once by easily handling the smart phone.

The smart phone 2100 and the IR repeater 2300 may connect to a device separated by 100 meters in maximum and perform wireless data communication, and they may communicate although there is an obstacle on the way. Preferably, they are respectively provided with a Bluetooth module to perform short range communication with each other through Bluetooth communication which consumes a small power. Like this, since wireless data transmission and reception is possible between the smart phone and the IR repeater through Bluetooth communication, a user may freely move without being restricted by a specific position.

At this point, the wireless data communication between the smart phone 2100 and the IR repeater 2300 is not limited to the Bluetooth communication, but apparently, they may be configured to perform data communication using various wireless communication networks such as a Wi-Fi network or the like.

Accordingly, since the smart phone 2100 is not combined with a separate infrared ray generation apparatus, but the smart phone itself generates and transmits a driving signal of a digital device, and the IR repeater 2300 which transmits and receives data through wireless communication while being separated from the smart phone creates an infrared signal for controlling a digital device corresponding to the driving signal and transmits the infrared signal to each digital device, that is, since an apparatus for generating a control command is separated from an apparatus for generating an infrared ray, and the apparatuses are connected to each other through a variety of wireless communication networks such as a Bluetooth or Wi-Fi network so as to wirelessly communicate with each other, they can be used as an integrated control system for controlling digital devices installed inside a home without individually combining a separate infrared generation apparatus to the smart phone.

Referring to FIG. 8, the IR repeater 2300 includes a learning signal reception unit 2310 for receiving an infrared signal transmitted from a remote control device of a digital device, a microcomputer 2320 for capturing and storing the infrared signal received by the learning signal reception unit and transmitting the infrared signal to the smart phone, a wireless communication unit 2330 for transmitting and receiving data to and from the smart phone through a wireless communication network, a driving signal reception unit 2340 for receiving a driving signal of a digital device transmitted from the smart phone through the wireless communication unit, an infrared signal generation unit 2350 for creating an infrared signal corresponding to a custom code of the digital device and a data code, i.e., a control command, which configure the received driving signal, and an infrared signal transmission unit 2360 for transmitting the infrared signal toward the digital device.

The learning signal reception unit 2310 is configured as an infrared ray receiver (IR_Receiver) which is activated when the IR repeater is set to a learning mode and may receive the infrared signal transmitted from the remote control device 2250 of a digital device that is desired to be newly learned.

The microcomputer 2320 is configured to function as a control unit in charge of general control of the IR repeater and, in addition, capture and store the infrared signal as is received by the learning signal reception unit 2310 and transmit the infrared signal to the smart phone 2100.

Figure 9:
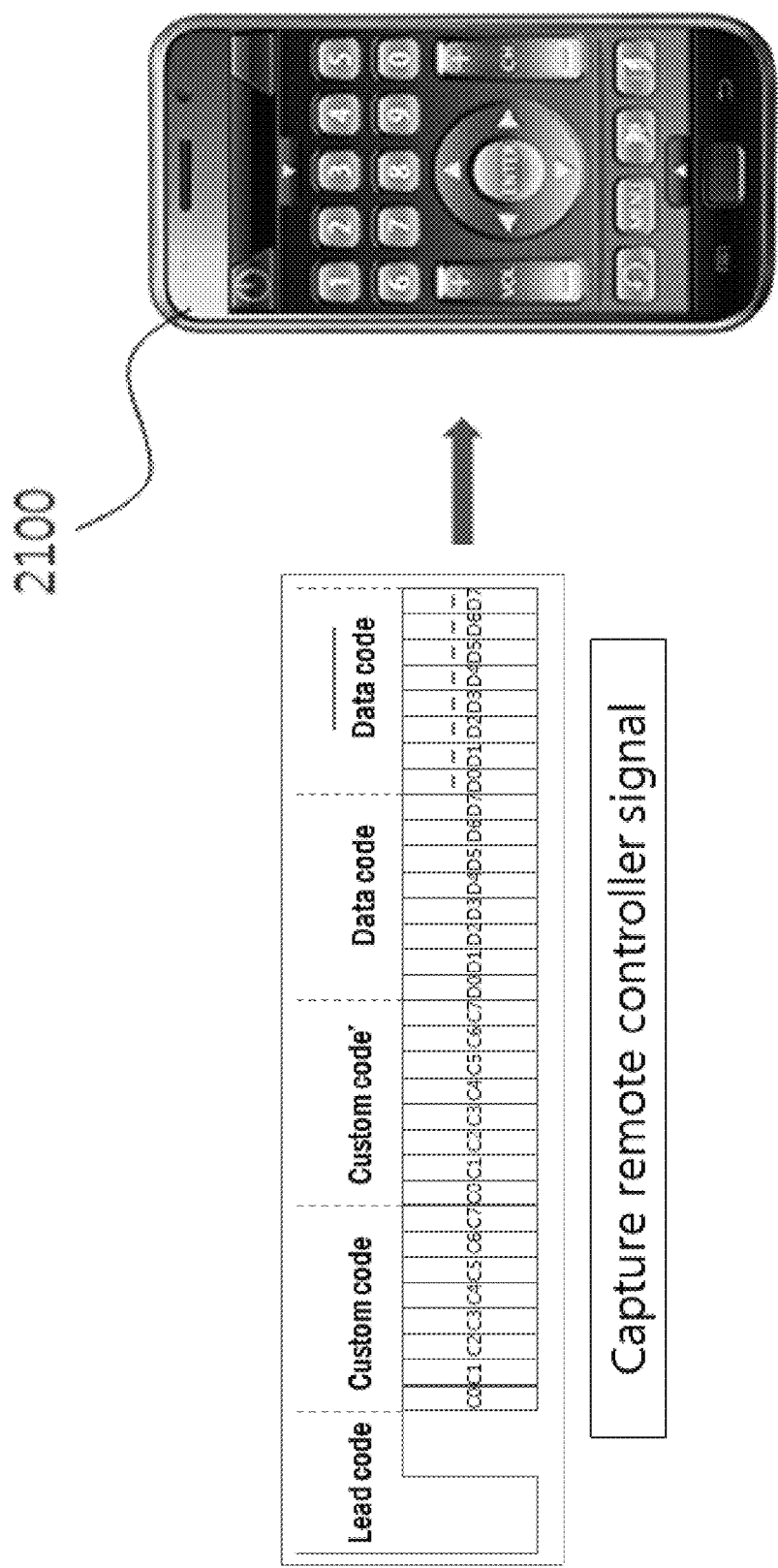
FIG. 9 is a configuration view showing an infrared signal stored in a smart phone and an IR repeater according to a second embodiment of the present invention.

At this point, the infrared signal takes a form of a signal transmitted from a general remote control device, and as shown in FIG. 9, it includes a lead code for activating a digital device desired to be controlled, a custom code functioning as an address for identifying the digital device, a data coda which is an actual control command of the digital device, and an inverted data code ($\overline{\text{Datacode}}$) inverting the data code.

In addition, the custom code may be formed as a single custom code, and, of course, it can be forced in a structure overlapping a first custom code and a second custom code formed by inverting or repeating the first custom code, i.e., a format diversely employed by each manufacturing company.

Accordingly, unlike a digital device which receives an infrared signal, is activated by the lead code, determines by itself whether or not the custom code is matched, and executes a command indicated by the following data code if the custom code is matched, the microcomputer 2320 is configured to capture the infrared signal in the learning mode as is integrating the lead code, the custom code, the date code and the inverted data code.

In addition, the IR repeater 2300 is configured to transmit the infrared signal integrating a plurality of codes like this to the separated smart phone 2100 through the wireless communication unit 2330.

The wireless communication unit 2330 is configured as a communication module which forms a communication path to the smart phone in order to transmit the captured infrared signal to the smart phone 2100 and receive a driving signal of the digital device transmitted from the smart phone through a wireless communication network such as a Bluetooth or Wi-Fi network.

The driving signal reception unit 2340 is configured to receive the driving signal of a remote controller format which includes a custom code of the digital device created by a driving signal creation unit 2160 provided in the smart phone and a data code which is a control command such as a turn-off signal or a turn-on signal, through the wireless communication unit.

At this point, the driving signal reception unit 2340 is configured to separate the custom code indicating a digital device and the data code which is a control command of the corresponding digital device from the received driving signal and recognize an appropriate digital device 2200 to which the control command is transmitted by comparing the custom code with custom codes stored in the custom code storage unit provided in the IR repeater.

To this end, the IR repeater 2300 preferably further includes a custom code storage unit 2370 configured as memory which stores initially stored custom codes of digital devices manufactured by domestic and foreign companies and custom codes of new digital devices acquired through the learning signal reception unit.

The infrared signal generation unit 2350 is configured as an infrared ray generation means for generating an infrared signal corresponding to the custom code and the control command recognized by the driving signal reception unit, and the infrared signal transmission unit 2360 is configured to control operation of the digital device by transmitting the infrared signal generated by the infrared signal generation unit.

At this point, since the infrared signal transmitted from the infrared signal transmission unit 2360 has directionality like a general remote controller, the infrared signal transmission unit 2360 is configured to include a plurality of infrared light emitting diodes arranged on the outer surface of the IR repeater in a radial pattern so as to transmit the infrared signal to the digital device without greatly being affected by a position of the IR repeater, and it is preferable that the infrared signal generated by the infrared signal generation unit is simultaneously transmitted from the entire infrared light emitting diodes included in the infrared signal transmission unit.

The infrared signals simultaneously transmitted from the infrared signal transmission unit in a radial pattern are transmitted to a digital device desired to be controlled, and turning on and off and control of the digital device may be performed by a control command stored in the data code.

In addition, as shown in FIG. 8, the smart phone 2100 includes a control driving unit 2110 and 2120 for creating individual driving signals for controlling a plurality of digital devices by a user input, an infrared signal learning unit 2130 for receiving an infrared signal of a new digital device transmitted from the IR repeater, an infrared signal storage unit 2140 for matching the infrared signal to a control command of a digital device desired to be controlled by a corresponding signal and storing the infrared signal, an interface creation unit 2150 for creating a user interface that can easily handle the control command matched by the infrared signal storage unit and storing the user interface, a driving signal creation unit 2160 for creating a driving signal of the digital device by handling an input unit displayed on a display means of the smart phone, and a transmitter communication unit 2170 capable of performing wireless communication with the IR repeater.

At this point, although the control driving unit, the infrared signal learning unit, the interface creation unit and the driving signal creation unit may be installed in the smart phone in the form of a hardware module, they are preferably installed in the smart phone in the form of a software application.

The control driving unit includes an integrated control unit 2110 for displaying and activating an interface for selecting a digital device and inputting a control command of the digital device on the display means of the smart phone and a control signal input unit 2120 for receiving an input signal of a user who handles the interface displayed on the display means.

The control signal input unit 2120 includes a screen display unit for displaying a manual which shows a device name, channel and voice control keys, numeric input keys and the like of a selected digital device, a motion recognition unit provided with a plurality of function keys such as numeric keys, menu keys, a cancel key, a confirm key, a turn-off key and the like, for transmitting data input through a touch or a drag of a user to the integrated control unit, and a voice recognition unit for converting a voice signal received through a microphone into a digital data and transmitting the digital data to the integrated control unit.

At this point, the smart phone 2100 preferably includes a custom code storage unit 2180 for storing a custom code of a digital device desired to be controlled, in the same manner as the IR repeater. The custom code storage unit 2180 is configured as memory which stores custom codes of digital devices manufactured by domestic and foreign companies and automatically stored when an application is installed and custom codes of new digital devices acquired through the infrared signal learning unit.

The infrared signal learning unit 2130 is configured to receive the captured infrared signal of the new digital device transmitted from the IR repeater as is integrating a lead code, a custom code, a data code and an inverted data code.

The infrared signal storage unit 2140 is configured to match the infrared signal received in a form integrating a variety of codes to a control command desired to be implemented by a corresponding infrared signal and store the infrared signal.

At this point, although the infrared signal storage unit 2140 may be configured to separate the custom code and the data code included in the infrared signal and then store the data code, which is a control command, to be separate from the custom code so that the driving signal creation unit may create a driving signal in the future by combining the custom code and the data code, the infrared signal storage unit 2140 may be configured to match the integrated infrared signal to the control command and store the integrated infrared signal as is so that the integrated infrared signal may be read and transmitted to the IR repeater as is when the driving signal is created in the future.

The interface creation unit 2150 may be configured to store the integrated infrared signal as is as a control command and store a function or the like that will be frequently used by a user to be matched to a separate button so that a diverse and convenient user interface may be created for each digital device.

Accordingly, since it is possible to solve the problem of a general universe remote controller, such as the difficulties in handling all the functions of various digital devices using a limited number of keys, further more digital devices can be used in an integrated manner by one smart phone in a user interface situation appropriate to each digital device.

At this point, it is apparent that the interface creation unit 2150 may easily add an independent function button for executing a new characteristic function of each digital device and display the function button on the display means by the integrated control unit.

The driving signal creation unit 2160 is configured to create a driving signal by combining a custom code and a data code of a digital device selected by a handling signal of the control signal input unit displayed on the smart phone by the control driving unit. At this point, in the case of a driving signal stored in the form of an integrated infrared signal through the infrared signal learning unit 2130, it may be configured to read the integrated infrared signal stored in the infrared signal storage unit and create a driving signal by selecting a control command or a function button.

At this point, since the driving signal creation unit 2160 reads the custom code of a corresponding digital device stored in the custom code storage unit and creates a driving signal based on the read custom code, even the IR repeater receiving the driving signal may also create an infrared signal having a custom code appropriate for controlling the corresponding digital device.

Since the transmitter communication unit 2170 is configured as a communication module provided in the smart phone, which is capable of performing wireless data communication such as Bluetooth or Wi-Fi communication, and thus may transmit and receive data to and from the IR repeater, it is configured to receive a captured infrared signal that will be learned by the smart phone from the IR repeater and transmit the driving signal of the digital device created by the driving signal creation unit to the IR repeater.

In addition, the smart phone 2100 preferably further includes a macro learning unit 2190 for consecutively creating driving signals in order to sequentially operate a digital device according to a set value.

The macro learning unit 2190 may be configured to sequentially execute different control commands for the same digital device, and it may be configured to sequentially select a plurality of digital devices and consecutively operate the digital devices.

Figure 10:
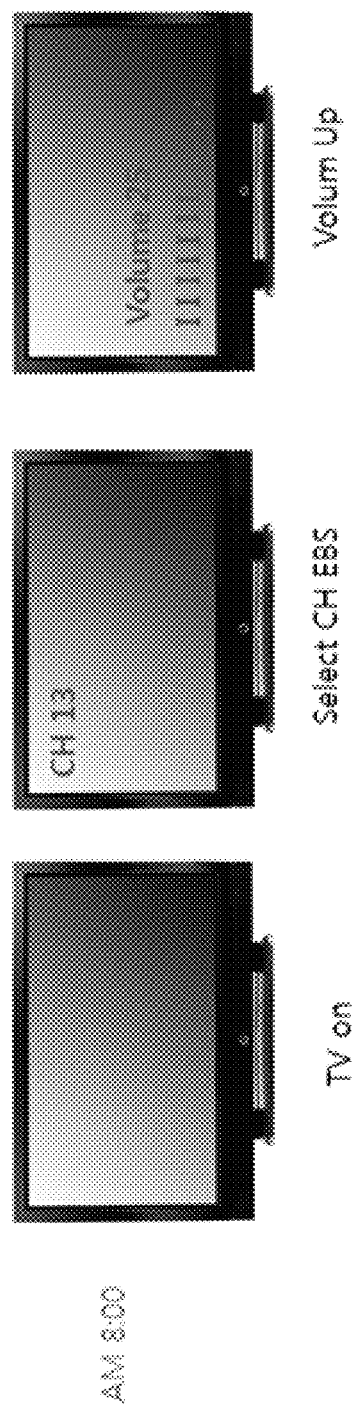
FIG. 10 is an exemplary view showing implementation of macro learning according to a second embodiment of the present invention.

FIG. 10 is an exemplary view showing implementation of macro learning according to the present invention.

The macro learning unit 2190 is configured to create driving signals for varying the data code, which is a control command, at predetermined time intervals for the same custom code so that different control commands may be sequentially executed for the same digital device.

Accordingly, the macro learning unit 2190 transmits a first driving signal at a predetermined time, and thereafter, it sequentially creates a plurality of driving signals including a scheduled control command and transmits the driving signals to the IR repeater as a set time is elapsed.

Referring to FIG. 10, the macro learning unit 2190 is configured to turn on a television (TV on) first at 8:00 PM, which is a time set in advance, and then select the EBS channel (CH 13), and if a user does not respond, it gradually increases volume of the TV (Vol Up) to help the user wake up.

In addition, when a plurality of digital devices is sequentially selected and consecutively operated, the macro learning unit 2190 is configured to generate a driving signal for activating a digital device by combining a control command matching to each custom code while varying the custom code according to a set time.

In addition, a separate timer (not shown) may be provided in the IR repeater 2300, and the IR repeater 2300 may receive a macro driving signal transmitted from the smart phone, store the macro driving signal in the microcomputer, and create and transmit infrared signals appropriate to the macro driving signal when a previously set time arrives so that the digital device may perform sequential operations.

In this case, a macro driving signal for the digital devices desired to be consecutively operated, for example, a macro driving signal for turning on a lamp at 7:00 PM, turning on a boiler at 7:30 PM, turning on a TV at 8:00 PM and the like, may be conveniently created using the smart phone in order to automatically control the digital devices, and thus home automation may be implemented easily at a low cost.

Next, a third embodiment of the digital device control system using a smart phone according to the present invention will be described with reference to the accompanying drawings.

Figure 11:
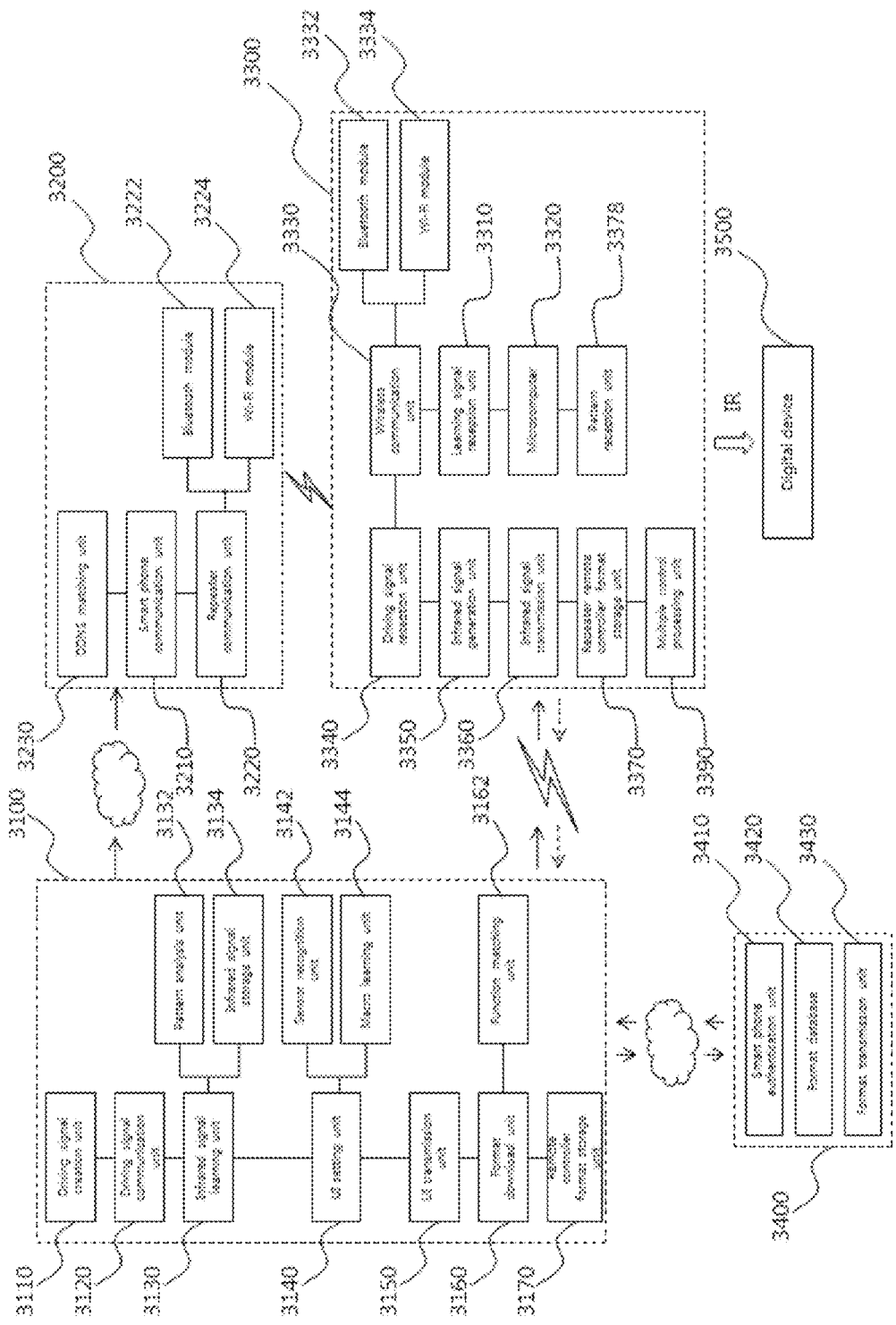
FIG. 11 is a block diagram showing a third embodiment of a digital device control system using a smart phone according to the present invention.
Figure 12:
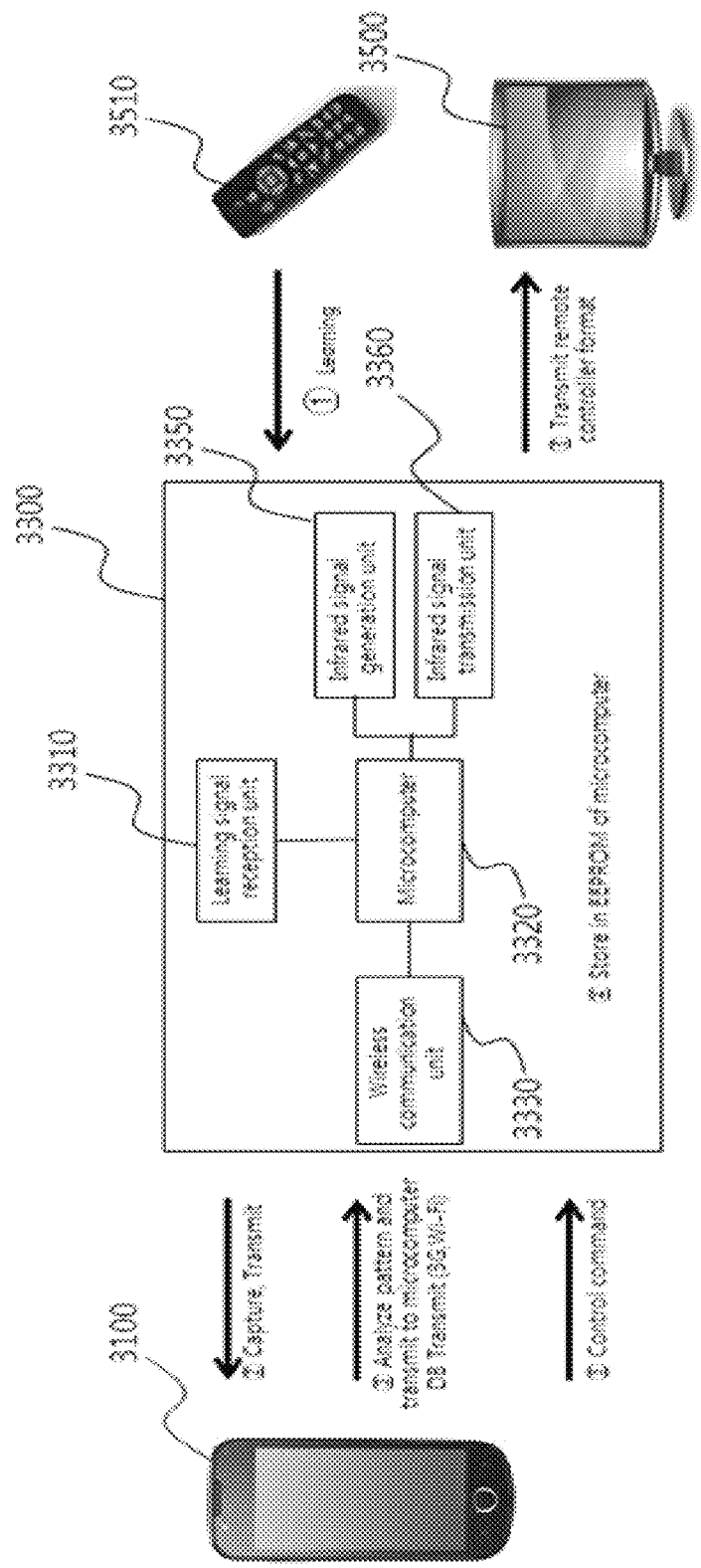
FIG. 12 is a configuration view schematically showing the steps of learning an infrared signal according to a third embodiment of the present invention.
Figure 13:
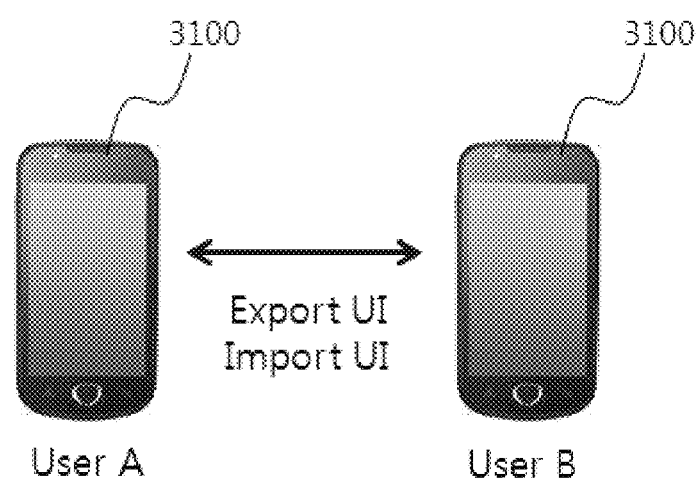
FIG. 13 is a configuration view schematically showing transmission of a user interface (UI) between smart phones according to a third embodiment of the present invention.
Figure 14:
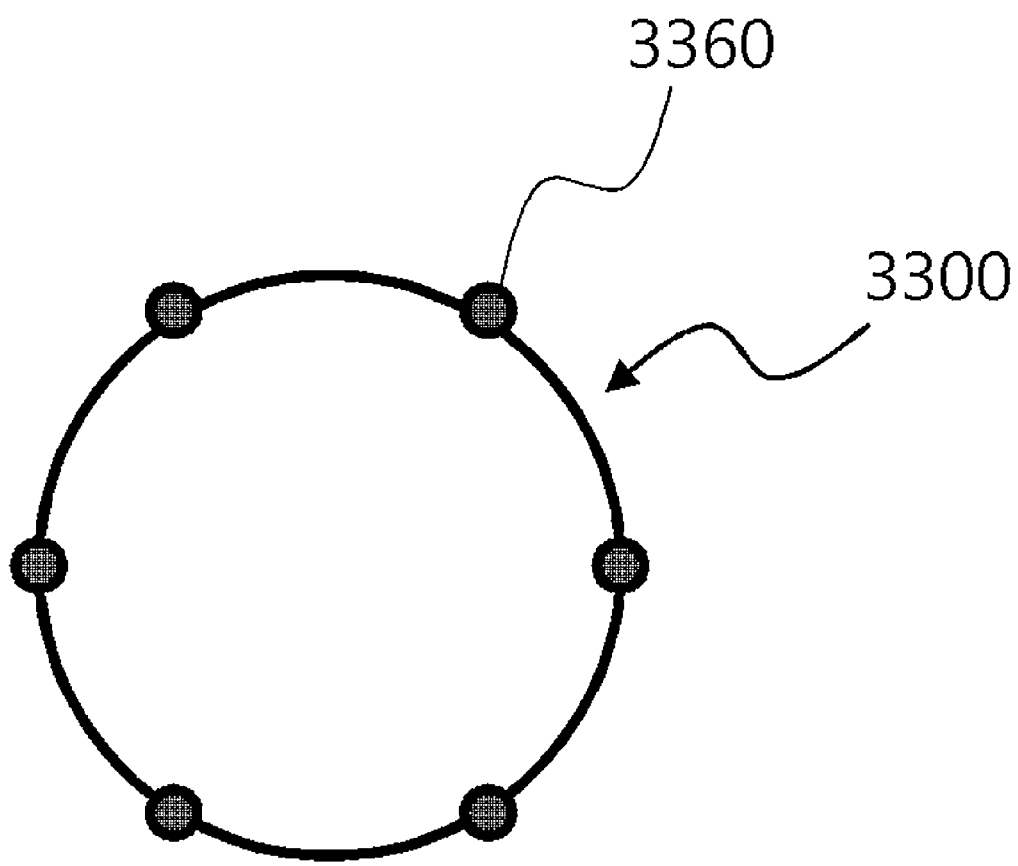
FIG. 14 is a configuration view showing an IR repeater provided with IR LEDs installed in a radial pattern according to a third embodiment of the present invention.
Figure 15:
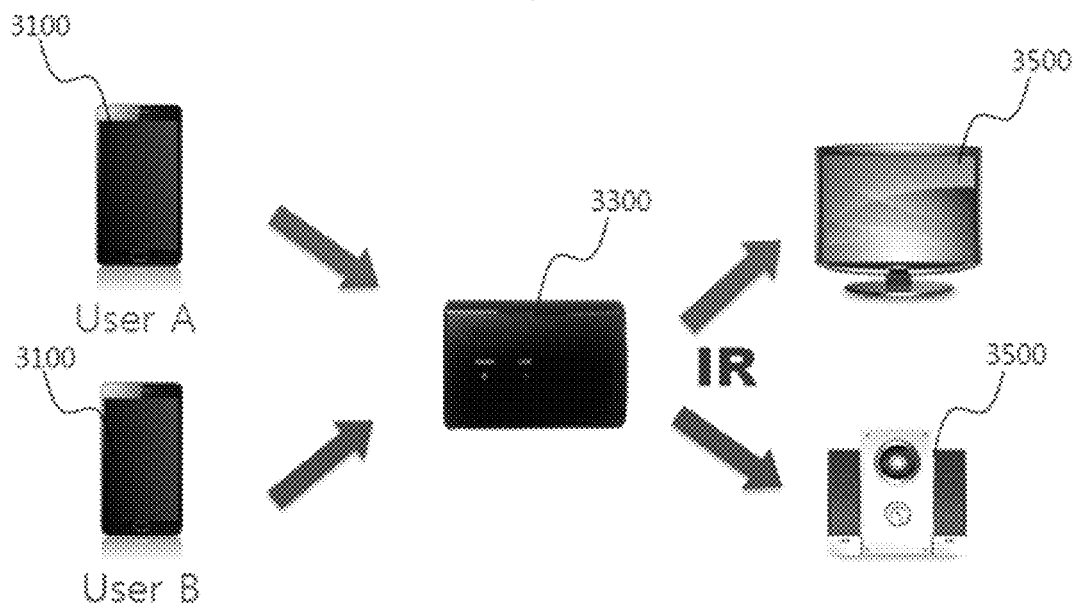
FIG. 15 is a configuration view showing multiple control of a plurality of digital devices by an IR repeater according to a third embodiment of the present invention.
Figure 16:
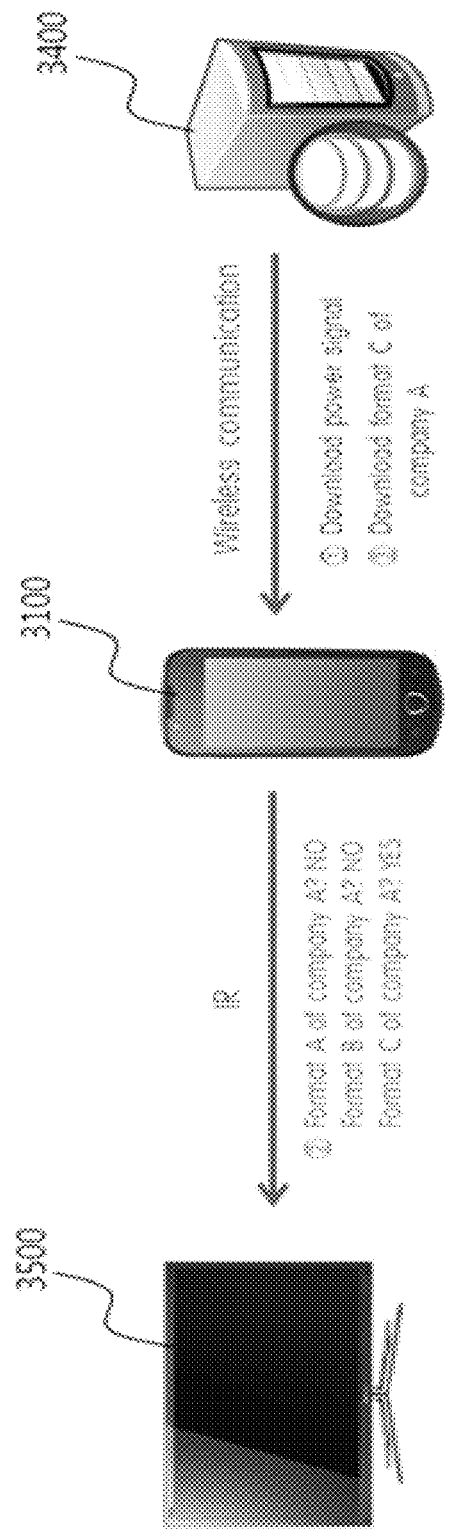
FIG. 16 is a configuration view schematically showing the steps of searching for and downloading a remote controller format from a format server according to a third embodiment of the present invention.

FIG. 11 is a block diagram showing a third embodiment of a digital device control system using a smart phone according to the present invention, FIG. 12 is a configuration view schematically showing the steps of learning an infrared signal according to a third embodiment of the present invention, FIG. 13 is a configuration view schematically showing transmission of a user interface (UI) between smart phones according to a third embodiment of the present invention, FIG. 14 is a configuration view showing an IR repeater provided with IR LEDs installed in a radial pattern according to a third embodiment of the present invention, FIG. 15 is a configuration view showing multiple control of a plurality of digital devices by an IR repeater according to a third embodiment of the present invention, and FIG. 16 is a configuration view schematically showing the steps of searching for and downloading a remote controller format from a format server according to a third embodiment of the present invention.

Referring to FIG. 11, the third embodiment of the digital device control system using a smart phone according to the present invention is configured to include the smart phone 3100 for creating and transmitting a driving signal for controlling a digital device by handling a button displayed on a display means by activating a digital device control application, a relay home server 3200 for receiving the driving signal transmitted from the smart phone of outside and transmitting the driving signal to an IR repeater installed inside of a room, and the IR repeater 3300 for receiving the driving signal transmitted from the relay home server and creating and transmitting an infrared signal corresponding to a control command of the driving signal.

At this point, the relay home server 3200 includes a smart phone communication unit 3210 configured as a Wi-Fi module for receiving the driving signal transmitted from the smart phone placed outside and a repeater communication unit 3220 for transmitting the driving signal received from the smart phone to the IR repeater placed inside of the room.

Accordingly, the repeater communication unit 3220 is configured as a communication means capable of transmitting and receiving data according to a wireless communication unit 3330 provided in the IR repeater, and when a Bluetooth module 3332 is provided in the IR repeater, the repeater communication unit is also configured as a Bluetooth module 3222, and when a Wi-Fi module 3334 is provided in the IR repeater, the repeater communication unit is also configured as a Wi-Fi module 3224 such as a wireless LAN or the like capable of performing Wi-Fi communication.

In addition, the digital device control system using a smart phone according to the present invention preferably further includes a format server 3400 for providing a remote controller format for authenticating a smart phone user connected from a wireless communication network and controlling a digital device desired to be handled using the smart phone.

The smart phone 3100 includes a driving signal creation unit 3110 for creating and transmitting a driving signal for controlling a digital device, a driving signal communication unit 3120 for converting the driving signal of a digital device created by the driving signal creation unit into a form that can be processed by the communication modules provided in the relay home server and the IR repeater and transmitting the converted driving signal, an infrared signal learning unit 3130 for receiving and storing an infrared signal of a new digital device transmitted from the IR repeater, and a UI setting unit 3140 for creating an interface of a smart phone user for adjusting a function of a newly learned infrared signal.

At this point, the digital device control application is preferably downloaded from the wireless communication network in the form of software and installed in the smart phone so as to improve convenience of a smart phone user in using the smart phone.

The driving signal creation unit 3110 is configured to select a digital device 3500 desired to be handled, display and activate an interface for inputting a control command of the selected digital device on the display means of the smart phone 3100, create a control signal matching to an input signal of a user who handles the interface displayed on the display means, and transmit the control signal to the relay home server 3200 or the IR repeater 3300.

Accordingly, the driving signal creation unit 3110 displays the name, channel and volume control keys, numeric input key and the like of the selected digital device on the display means, creates a driving signal for executing a function matching to a corresponding handling signal based on a handling signal input by handling a plurality of keys displayed on the screen, and transmits the driving signal through the wireless communication network.

At this point, the driving signal creation unit 3110 is configured to create a driving signal by combining a custom code and a data code of a digital device selected by a signal input by handling the interface displayed on the smart phone. In this case, since the driving signal creation unit 3110 reads a remote controller format of a corresponding digital device stored in a remote controller format storage unit 3170 and creates the driving signal based on the read remote controller format including a custom code, a data code and the like, the IR repeater 3300 receiving the driving signal may also create an infrared signal having a remote controller format appropriate for controlling the corresponding digital device.

The driving signal communication unit 3120 is a device for transmitting the driving signal of the digital device created by the smart phone to the relay home server 3200 or the IR repeater 3300, which is configured as a Bluetooth module or a Wi-Fi module provided in the smart phone 3100 so that wireless data communication may be performed.

At this point, when the smart phone user is inside of the room, the driving signal may be transmitted and received directly to and from the IR repeater 3300 through the Bluetooth module, whereas when the smart phone user is outside of the room, the driving signal is transmitted to the relay home server 3200 through the Wi-Fi module, and then the driving signal is transmitted from the relay home server 3200 to the IR repeater 3300 installed inside of the room, and therefore, the digital device 3500 can be handled when the user is outside as well as inside of the room, and thus home automation may be conveniently implemented at a low cost.

In addition, the smart phone 3500 preferably further includes a remote controller format storage unit 3170 for storing a remote controller format including various kinds of codes for controlling a corresponding digital device, including a custom code and a data code of a digital device desired to be controlled, so that appropriate custom and data codes may be created according to the digital device. The remote controller format storage unit 3170 is configured as memory for storing a custom code and a data code of a new digital device acquired through the infrared signal learning unit, in addition to custom codes and data codes of digital devices manufactured by domestic and foreign electronics companies, which are automatically stored when an application is installed.

The infrared signal learning unit 3130 includes a pattern analysis unit 3132 for receiving the infrared signal of the new digital device transmitted after being captured by the IR repeater, analyzing the pattern of the infrared signal, and compressing and storing the infrared signal, and an infrared signal storage unit 3134 for storing the captured infrared signal of the new digital device as is transmitted from the IR repeater, together with the control command of the corresponding infrared signal.

In order to teach the smart phone to learn an infrared signal formed of a custom code, a data code and the like of a new digital device, as shown in FIG. 12, if the IR repeater 3300 receives the infrared signal transmitted from a remote control device 3510 (shown as step ☐ in FIG. 12) such as a remote controller for handling the new digital device, captures the infrared signal as is and transmits the infrared signal (shown as step ☐ in FIG. 12) through the Bluetooth module 3332 or the Wi-Fi module 3334, which is the wireless communication module 3330 capable of performing data communication with the smart phone, the smart phone 3100 activates the learning mode of the digital device control application and then receives the infrared signal through the infrared signal learning unit 3130.

At this point, the pattern analysis unit 3132 is configured to analyze a lead code, a custom code, a data code, an inverted data code and the like included in the infrared signal by analyzing whether a binary code configuring the infrared signal of the digital device captured and transmitted by the IR repeater is a low pulse or a high pulse, a pattern of changes in the length of the low pulse and high pulse and the like, and minimize (compress) the analyzed infrared signal and store the compressed infrared signal in the remote controller format storage unit 3170 configured as memory or the like (shown as step ☐ in FIG. 12).

In addition, the pattern analysis unit 3132 is configured to store the infrared signal analyzed and compressed as described above in the memory provided in the smart phone, which configures the remote controller format storage unit 3170, and in a repeater remote controller format storage unit 3370 provided in the IR repeater and configured as a storage device such as EEPROM or the like through the data communication network connected to the IR repeater 3330 (shown as step ☐ in FIG. 12).

Next, the IR repeater 3200 receives the driving signal including a control command and transmitted from the smart phone 3100 (shown as step ☐ in FIG. 12), creates an infrared signal of a remote controller format corresponding to the corresponding driving signal and transmits the infrared signal to the digital device 3500 (shown as step ☐ in FIG. 12) so that the digital device 3500 may execute the corresponding control command.

In addition, the pattern analysis unit 3132 may be configured to analyze the pattern of the infrared signal for the new digital device and then store the analyzed infrared signal in a separate format server 3400 through a wireless communication network. Since the infrared signal of the new digital device on which the pattern analysis is performed as described above is stored in the IR repeater 3300 or the format server 3400 separated from the smart phone, other users may easily download and use the infrared signal on the wireless communication network.

The infrared signal storage unit 3134 is configured to receive the captured infrared signal of the new digital device transmitted from the IR repeater 3300 in a form as is integrating a lead code, a custom code, a data code, an inverted data code and the like configuring the infrared signal, match the received infrared signal to a control command desired to be implemented by the corresponding infrared signal and store the infrared signal. If the integrated infrared signal is matched to the control command and stored as is as described above, the integrated infrared signal is read as is and transmitted to the IR repeater when a driving signal is created in the future, and the IR repeater creates and transmits an infrared signal corresponding to the control command, and thus the digital device is handled.

The UI setting unit 3140 is configured to form an interface required for handling each digital device 3500 depending on the type of a digital device that can be controlled using a smart phone, match a function, a number or a character to each function key, numeric key or character key configuring the interface, and store the interface.

At this point, the UI setting unit 3140 allows each user to conveniently set a user interface (UI) by newly adding a button that can perform a function required for handling a specific digital device or deleting an unnecessary button.

It is apparent that when a user interface for handling a digital device is formed as described above, the UI setting unit may be configured to create a group button which is a collection of various related functions for handling the digital device.

Accordingly, the group button for performing specific functions may learn a control command for executing each of the functions so as to improve convenience of use. In addition, since the functions are not learned one by one, but the group button itself is stored in the format server and shared among users of the same digital device, the group button may be easily formed by updating an application of a corresponding group button.

In addition, the UI setting unit 3140 is configured to display keys required for handling a digital device on the display means, and it is handled only by a touch, a drag or a voice recognized by a user for the keys displayed on the display means as described above. Furthermore, the UI setting unit 3140 preferably further includes a sensor recognition unit 3142 for recognizing an input related to a handling function of a digital device based on the information on the movement of the smart phone recognized by an acceleration sensor or a direction sensor provided in the smart phone.

At this point, the sensor recognition unit 3142 is configured to recognize motions and movements of a smart phone itself and match handling functions of a digital device to the motions and movements of the smart phone 3100. To this end, the sensor recognition unit 3142 is connected to receive information on the motions of the smart phone from the acceleration sensor or the direction sensor provided in the smart phone, and a user may set a desired function and match a function of the digital device to the information on the movement of the smart phone.

Accordingly, as an example of matching a TV function using the sensor recognition unit, the sensor recognition unit 3142 may match a channel up signal to a movement of the smart phone to the right side, a channel down signal to a movement of the smart phone to the left side, a volume up signal to a movement of the smart phone to the front side, and a volume down signal to a movement of the smart phone to the rear side using the acceleration sensor and the direction sensor. This function matching is only an example, and it is apparent that a movement of the smart phone can be matched to a handling function of a digital device in a variety of methods other than this function matching.

In addition, the UI setting unit 3140 preferably further includes a macro learning unit 3144 for setting the smart phone to sequentially activate different driving signals as a specific time arrives or a predetermined time period is elapsed so that the driving signals may be created and transmitted.

In addition, since the relay home server 3200 receives the macro driving signal created and transmitted from the smart phone 3100 as a predetermined time is arrived or elapsed and transmits the macro driving signal to the IR repeater 3300 placed inside of a room so that the digital device 3500 may be handled even when a user is outside of the room, home automation may be easily constructed without spending too much cost.

In addition, as shown in FIG. 13, the smart phone 3100 preferably further includes a UI transmission unit 3150 for creating a gateway which transmits and receives data among smart phones in which a digital device control application is installed and transmitting and receiving the UI through the gateway so that the users handling the same digital device may share the UI set by a user through the UI setting unit and stored in the smart phone.

In addition, the smart phone 3100 preferably further includes a format download unit 3160 connected to the format server 3400 on the wireless communication network to transmit and receive data so as to upload and store an infrared signal pattern, i.e., a remote controller format, of a digital device, which is learned and analyzed through the infrared signal learning unit 3130, onto the format server 3400 through the wireless communication network and download a remote controller format previously uploaded by another user or a digital device manufacturer from the format server.

Accordingly, a user connected to and authenticated by the format server 3400 through the format download unit 3160 may download and easily use various remote controller formats of various kinds of digital devices.

In addition, the smart phone 3100 preferably further includes a function matching unit 3162 for matching a display button on the remote controller format to a function of the digital device and storing the remote controller format so that each smart phone user may maintain an individual interface by matching the remote controller format, i.e., the infrared signal format, downloaded through the format download unit 3160 to display buttons on the user interface set in the smart phone of the user.

The relay home server 3200 is configured as a home server installed inside of a room and provided with a communication means for receiving a driving signal transmitted from a smart phone placed outside of the room through a 3G network or Wi-Fi communication via a base station.

At this point, a wireless LAN module, which is a Wi-Fi module capable of receiving a driving signal transmitted from the smart phone placed outside of a room, is provided in the relay home server 3200 as the smart phone communication unit 3210, and a Bluetooth module 3222 formed as a Bluetooth dongle or the like is provided as the repeater communication unit 3220 for transmitting the driving signal received by the Wi-Fi module to the IR repeater installed inside of the room.

In addition, when a Wi-Fi module 3334 capable of transmitting and receiving data through Wi-Fi communication is provided in the IR repeater 3300, it is apparent that the repeater communication unit 3220 of the relay home server 3200 may be configured as a Wi-Fi module 3224 without providing a Bluetooth module for transmitting and receiving data to and from the relay home server inside the room.

At this point, the relay home server 3200 preferably includes a DDNS matching unit 3230 that can implement a Dynamic Domain Name System (DDNS) service which automatically updates a DNS database by matching a dynamic IP address and a host domain whenever a new IP address is allocated by an Internet service provider. Accordingly, even a user who uses an Internet service based on the dynamic IP address may stably receive a driving signal of a digital device transmitted from the smart phone through a 3G network or Wi-Fi communication and control the digital device.

Generally, if a user connects to the Internet, an Internet service provider allocates a dynamic IP address so that a personal computer or the like provided in a home or the like may be used as a server. However, since the user should know a new IP address in order to connect to the personal computer again, a home personal computer is difficult to be used as a stable server.

Accordingly, the DDNS matching unit 3230 constructed as a program executed in a personal computer is installed in the personal computer in order to match a dynamic IP address and a host domain so that a server may be stable used even when an IP address is dynamically changed in an optical LAN or a local cable network.

Since the DDNS matching unit 3230 automatically updates the DNS database whenever a new IP address is allocated by an Internet service provider so that other users may easily connect to a corresponding personal computer using a domain name as before without need to know the new updated IP address although an IP address corresponding to a specific domain name is changed, the personal computer can be used as a stable server. In addition, it is apparent that when the Internet service provider is not supported by the DDNS service, the same function can be implemented by creating a program which allows a stable connection by updating the DNS database whenever a new IP address is allocated and executing the program in a personal computer.

In addition, the relay home server 3200 may be configured as an IP router 3240 provided with a Wi-Fi module capable of receiving a driving signal transmitted through Wi-Fi communication via a local network. Like this, when the relay home server is configured as an IP router 3240, the driving signal can be transmitted and received by the IP router which maintains an activated state at all times although the personal computer is not operated continuously.

At this point, although the IP router 3240 may be provided with a separate Bluetooth module to transmit a driving signal received from a smart phone placed outside to the IR repeater, considering the characteristic of the IP router itself which is not easy to install another equipment or program therein, it is preferable that only a Wi-Fi module is provided in the IP router and the Wi-Fi module 3334 is installed in the IR repeater 3300 so that data can be transmitted and received to and from the IP router on the local network.

As described above, since a driving signal of a digital device transmitted from the smart phone 3100 placed outside of a room may be stably received through a 3G network or Wi-Fi communication by the relay home server 3200 configured as a personal computer or an IP router previously installed in most of homes, and the relay home server 3200 directly transmits the driving signal to the IR repeater 3300 placed in the same room, operation of the digital device may be stably controlled regardless of whether a user is inside or outside of the room, and thus the spatial constraint may be overcome when the digital device is controlled. Accordingly, since it is possible to easily and stably operate a digital device placed in a home from a remote position, home automation may be implemented without spending too much cost.

At this point, when a user handles a digital device while staying in a room, a driving signal is transmitted not through Wi-Fi communication, but the driving signal is transmitted directly between a smart phone and the IR repeater through a Bluetooth network, which is a short range communication network, confusions in operating the digital device can be prevented.

The IR repeater 3300 includes a driving signal reception unit 3340 for receiving a driving signal transmitted from the smart phone or the relay home server, an infrared signal generation unit 3350 for generating an infrared signal corresponding to a custom code and a control command of the digital device, which configure the received driving signal, an infrared signal transmission unit 3360 for transmitting the infrared signal toward the digital device, a learning signal reception unit 3310 for receiving an infrared signal transmitted from a remote control device of a new digital device, a microcomputer 3320 for capturing and transmitting the infrared signal received by the learning signal reception unit to the smart phone and receiving and storing an infrared signal the pattern of which is analyzed by the smart phone, and a wireless communication unit 3330 for receiving the driving signal from the smart phone or the relay home server.

The driving signal reception unit 3340 is configured to receive the driving signal of the digital device created by the driving signal creation unit 3110 of the smart phone and transmitted directly from the driving signal creation unit 3110 or via the relay home server 3200 through the wireless communication unit 3330.

To this end, the wireless communication unit 3330 may be configured as a Bluetooth module 3332 capable of transmitting and receiving data to and from the smart phone 3100 or the relay home server 3200 through a Bluetooth network or configured as a Wi-Fi module 3334 capable of transmitting and receiving data to and from the smart phone 3100 or the relay home server 3200 through a Wi-Fi network.

In addition, it is apparent that the wireless communication unit 3330 may be configured as a CDMA chip, and in this case, the IR repeater may directly receive a driving signal transmitted from the smart phone 3100 without intervention of a separate relay home server and create and transmit an infrared signal corresponding to the corresponding driving signal.

At this point, the driving signal reception unit 3340 is configured to separate a custom code indicating a digital device and a control command of a corresponding digital device from the received driving signal and recognize an appropriate digital device to which the control command will be transmitted, by comparing the custom code with custom codes stored in the repeater remote controller format storage unit provided in the IR repeater.

The repeater remote controller format storage unit 3370 is preferably configured to store remote controller formats including custom codes and data codes of digital devices released by domestic and foreign electronics companies, like the remote controller format storage unit provided in the smart phone.

The infrared signal generation unit 3350 is configured as an infrared ray generation means for creating an infrared signal based on a remote controller format corresponding to the custom code and the data code recognized by the driving signal reception unit, and the infrared signal transmission unit 3360 is configured to control operation of a digital device by transmitting the infrared signal created by the infrared signal generation unit to outside.

At this point, since the infrared signal transmitted from the infrared signal transmission unit 3360 has directionality like a general remote controller, as shown in FIG. 14, the infrared signal transmission unit 3360 is configured to include a plurality or infrared light emitting diodes arranged on the outer surface of the IR repeater 3300 in a radial pattern so as to transmit the infrared signal to the digital device without greatly being affected by a position of the IR repeater, and it is preferable that the infrared signal generated by the infrared signal generation unit is simultaneously transmitted from the entire infrared light emitting diodes included in the infrared signal transmission unit.

A controllable angle of signal emitted from a general infrared light emitting diode (IR LED) is generally ±30° when luminous intensity is 50% of the maximum luminous intensity. Accordingly, when six infrared light emitting diodes (IR LEDs) 3300 are arranged in a radial pattern as shown in FIG. 14, the infrared signal can be transmitted in all directions of 360°, and thus a digital device at any place may be easily controlled.

In addition, the learning signal reception unit 3310 is configured as an infrared ray receiver (IR_Receiver) which is activated when the IR repeater is set to a learning mode and may receive the infrared signal transmitted from the remote control device 3510, such as a remote controller, paired with a digital device that is desired to be newly learned.

The microcomputer 3320 is configured to function as a control unit in charge of general control of the IR repeater and, in addition, capture and store the infrared signal as is received by the learning signal reception unit 3310 and transmit the infrared signal to the smart phone.

At this point, the infrared signal takes a form of a signal transmitted from a general remote control device, and it includes a lead code for activating a digital device, a custom code functioning as an address for identifying the digital device, a data code which is an actual control command of the digital device, and an inverted data code ($\overline{\text{Datacode}}$) inverting the data code.

In addition, the custom code may be formed as a single custom code, and, of course, it can be formed in a structure overlapping a first custom code, i.e., a format diversely employed by each manufacturing company, and a second custom code formed by inverting or repeating the first custom code.

In addition, as shown in FIG. 15, the IR repeater 3300 preferably further includes a multiple control processing unit 3390 for controlling operation of each digital device by sequentially creating infrared signals according to the custom code and the data code included in each of driving signals transmitted from a plurality of smart phones.

It may frequently occur that several people in a home transmit several kinds of driving signals to the same IR repeater 3300 using a smart phone 3100 of each person. That is, when user A desires to control a TV and user B desires to control an audio system, they almost simultaneously create and transmit a driving signal using their smart phones, and the multiple control processing unit 3390 creates and transmits an infrared signal corresponding to each driving signal in order of the driving signals received by the driving signal reception unit.

Like this, since the multiple control processing unit 3390 receives the driving signals transmitted from the smart phones and sequentially creates and transmits infrared signals corresponding to the received driving signals, a plurality of digital devices can be controlled by a single IR repeater even when several users respectively control a digital device using a smart phone in the same space.

The format server 3400 includes a smart phone authentication unit 3410 for validating an access right to a format database by authenticating a user connected through a wireless communication network, a format database 3420 for storing remote controller formats of digital devices provided by domestic and foreign manufacturers or user interfaces uploaded by users who learn infrared signals and create the user interfaces appropriate to themselves, and a format transmission unit 3430 for transmitting a remote controller format and a user interface selected by the user to the smart phone of the authenticated user.

At this point, the format database 3420 is configured to receive and store infrared signal data that is minimized (compressed) and uploaded from the smart phone 3100 through the wireless communication network after a remote controller format configuring an infrared signal is analyzed by activation of a learning mode.

Accordingly, if user A learns format A for a digital device of company A and stores the format into the format database 3420, as well as into the smart phone 3100 and the IR repeater 3300, user B activates a digital device control application installed in the smart phone and connects to the format server 3400, and then the user B is authenticated and granted with an access right to the format database 3420. After being granted with the access right to the format database 3420 as described, user B may easily store a remote controller format of a new digital device by downloading format A which is uploaded and stored by user A and storing the format A into the smart phone of user B and the IR repeater.

In addition, the format server 3400 may be configured such that several users learn remote controller formats of several digital devices using a community function such as a bulletin board or the like for sharing information among smart phones in which a digital device control application is installed, create a user interface of user's own, store the user interface in the format database, and confirm and share the user interface among the users.

Describing the process of connecting to the format server using a smart phone, searching for a remote controller format, and downloading and storing an appropriate remote controller format with reference to FIG. 16, a remote controller format stored in the IR repeater 3300 should be matched to a remote controller format stored in the smart phone 3100 if a remote controller format of a digital device 3500 provided in the home of a user is desired to be used in the smart phone.

Accordingly, in an example of a TV, after confirming the manufacturer (company A) of the TV desired to be handled by the digital device control application provided in the smart phone 3400, a user connects to the format server 3400 and is authenticated and granted with an access right to the format database 3420. At this point, since the remote controller format may be different from the others although the manufacturer is the same, a remote controller format appropriate to a corresponding TV should be confirmed at all times.

The digital device control application provided in the smart phone sequentially downloads a remote controller format of power of a TV manufactured by a corresponding manufacturer and confirms whether or not the TV is in operation. At this point, all the corresponding remote controller formats are not downloaded, but only the power remote controller formats are downloaded first (shown as step ☐ in FIG. 16), and operation of the TV 3500 is confirmed by transmitting a driving signal from the smart phone 3100 to the IR repeater 3300.

As shown in FIG. 16, since power of the TV is not turned on by format A or format B of company A, but the power of the TV is turned on by format C of company A (shown as step ☐ in FIG. 16), the smart phone 3100 downloads and stores the custom code, the data code and the like of an infrared signal formed in format C of company A from the format database 3420 (shown as step ☐ in FIG. 16).

As described above, if a remote controller format matching to the TV is selected, the user confirms the corresponding remote controller format displayed on the display means of the smart phone and downloads and stores the remote controller format from the format database 3420. At this point, after the function matching unit 3162 matches a button formed in the corresponding remote controller format and displayed on the display means of the smart phone to a function set to the button, the smart phone 3100 stores the remote controller format.

Next, a digital device placed in a home and controlled from inside or outside of a room shown in a third embodiment of a digital device control system using a smart phone according to the present invention will be described with reference to FIGS. 17 to 21.

Figure 17:
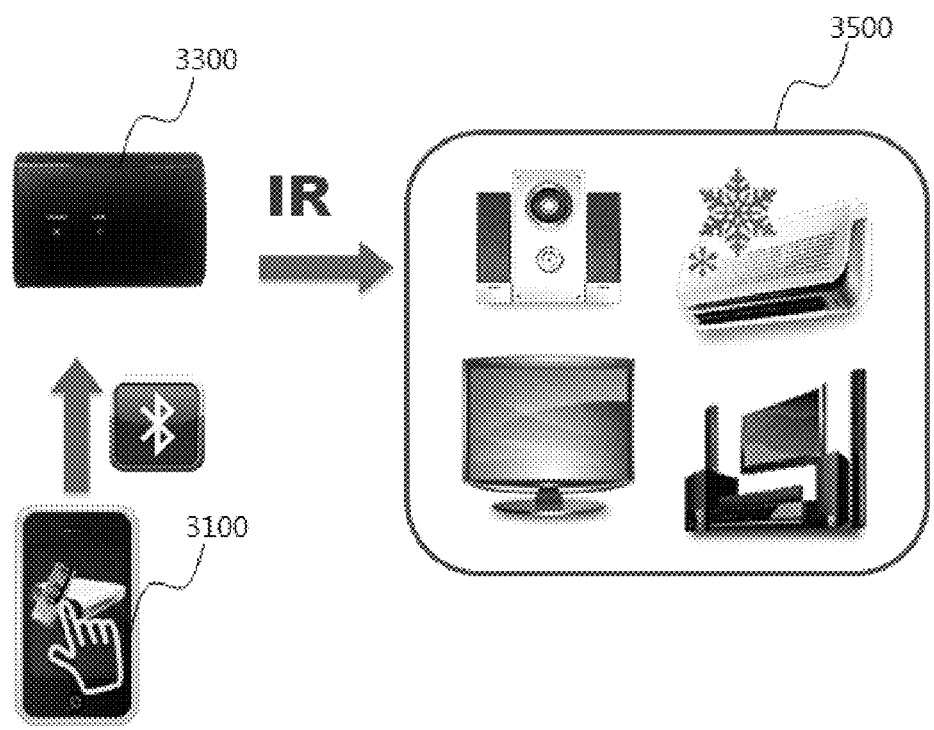
FIG. 17 is a system configuration view showing a first implementation example of a digital device control system using a smart phone according to a third embodiment of the present invention.

FIG. 17 is a system configuration view showing a first implementation example of a digital device control system capable of learning an infrared signal using a smart phone according to the present invention.

Referring to FIG. 17, the first implementation example shows an example of controlling an electronic product in a home by activating a digital device control application installed in a smart phone from inside of a room.

According to this, a Bluetooth module is provided in the smart phone 3100 and the IR repeater 3300, and the driving signal reception unit 3310 provided in the IR repeater receives a driving signal transmitted from the driving signal creation unit 3110 provided in the smart phone through the Bluetooth module and creates and transmits an infrared signal appropriate to the corresponding driving signal, and thus operation of an audio system, an air conditioner, a TV or a home theater in the home is controlled.

Figure 18:
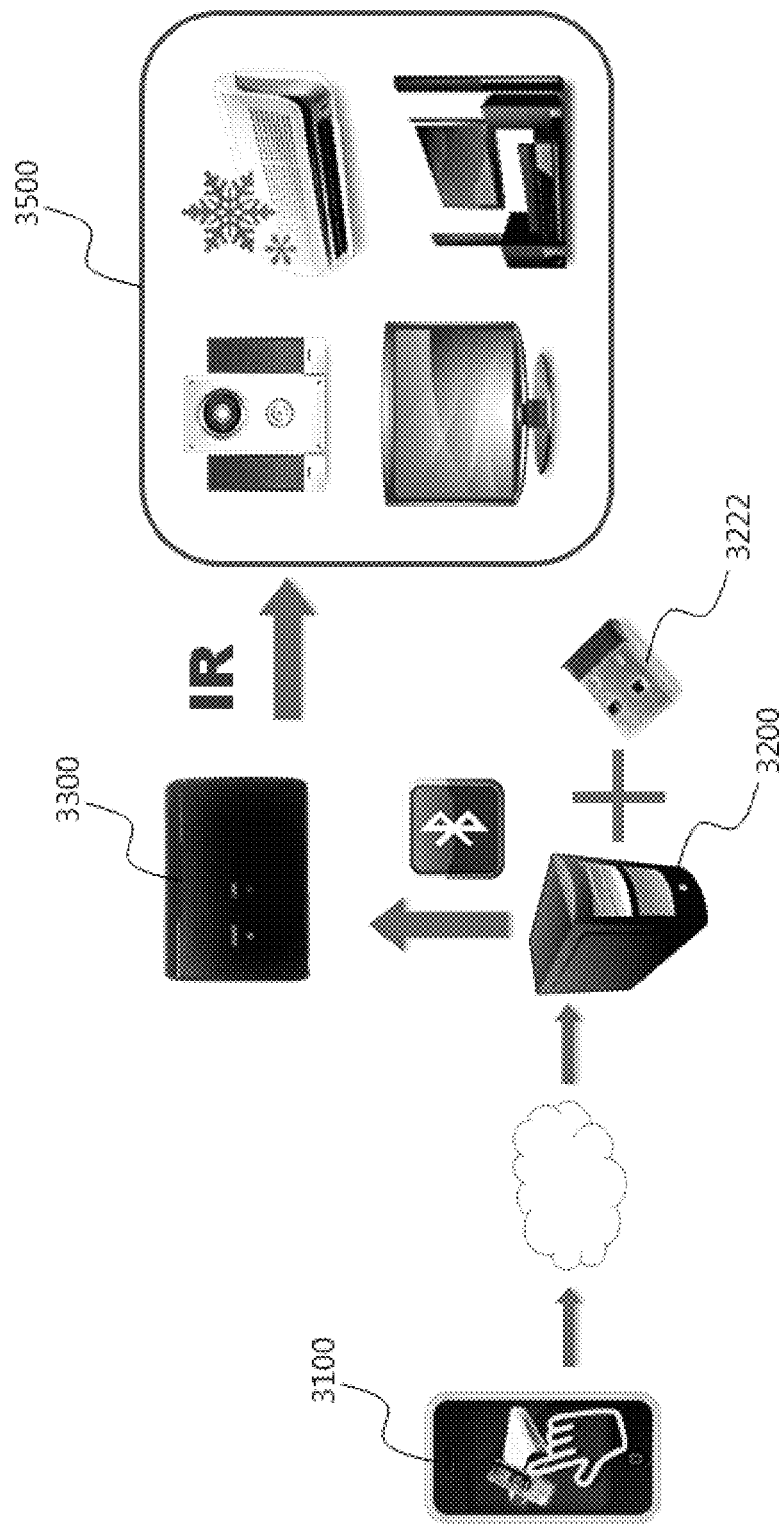
FIG. 18 is a system configuration view showing a second implementation example of a digital device control system using a smart phone according to a third embodiment of the present invention.

FIG. 18 is a system configuration view showing a second implementation example of a digital device control system capable of learning an infrared signal using a smart phone according to the present invention.

Referring to FIG. 18, the second implementation example of the present invention shows an example of controlling an electronic product in a home by activating a digital device control application installed in a smart phone from outside of a room.

To this end, in the relay home server 3200 configured as a personal computer which first receives a driving signal transmitted from a smart phone, a Wi-Fi module or the like is provided in a smart phone communication unit 3210 so as to transmit and receive data through an external 3G network or Wi-Fi communication, and a Bluetooth dongle, which is a Bluetooth module 3222 that can transmit the driving signal again to the IR repeater 3300 in the home, is provided in the repeater communication unit.

Accordingly, the driving signal, which is a device control signal for driving an electronic product in a home, transmitted from the smart phone is received through a 3G network or Wi-Fi communication depending on the smart phone communication unit 3210 provided in the relay home server 3200. At this point, the relay home server 3200 may stably receive the driving signal regardless of changes in the IP address, owing to the DDNS matching unit 3230.

The Bluetooth module 3222 in the relay home server transmits the driving signal to the IR repeater 3300 through Bluetooth communication, and the IR repeater 3300 receiving the driving signal transmitted from the smart phone 3100 via the relay home server 3200 as described above creates and transmits an infrared signal appropriate to the corresponding driving signal, and thus home automation can be implemented since operation of an audio system, an air conditioner, a TV or a home theater in the home can be stably controlled even from outside.

Figure 19:
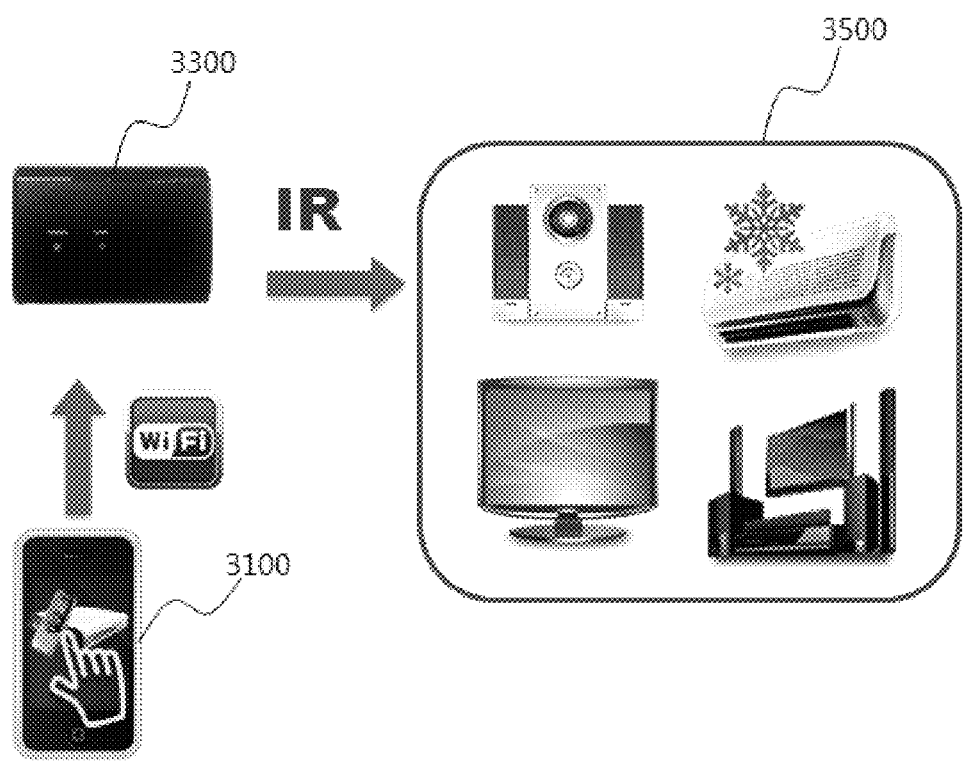
FIG. 19 is a system configuration view showing a third implementation example of a digital device control system using a smart phone according to a third embodiment of the present invention.

FIG. 19 is a system configuration view showing a third implementation example of a digital device control system capable of learning an infrared signal using a smart phone according to the present invention.

Referring to FIG. 19, the third implementation example of the present invention shows an example of controlling an electronic product in a home by activating a digital device control application installed in a smart phone from inside of a room. At this point, in the third implementation example, a Wi-Fi module 3334 capable of transmitting and receiving data through Wi-Fi communication is provided in the IR repeater 3300.

Since the Wi-Fi module 3334 is provided in the IR repeater as described above, if the smart phone transmits a driving signal, which is a device control signal of an electronic product transmitted from the smart phone through Wi-Fi communication, to the IR repeater, the IR repeater 3300 creates and transmits an infrared signal appropriate to the received driving signal, and thus operation of an audio system, an air conditioner, a TV or a home theater in the home is controlled.

Figure 20:
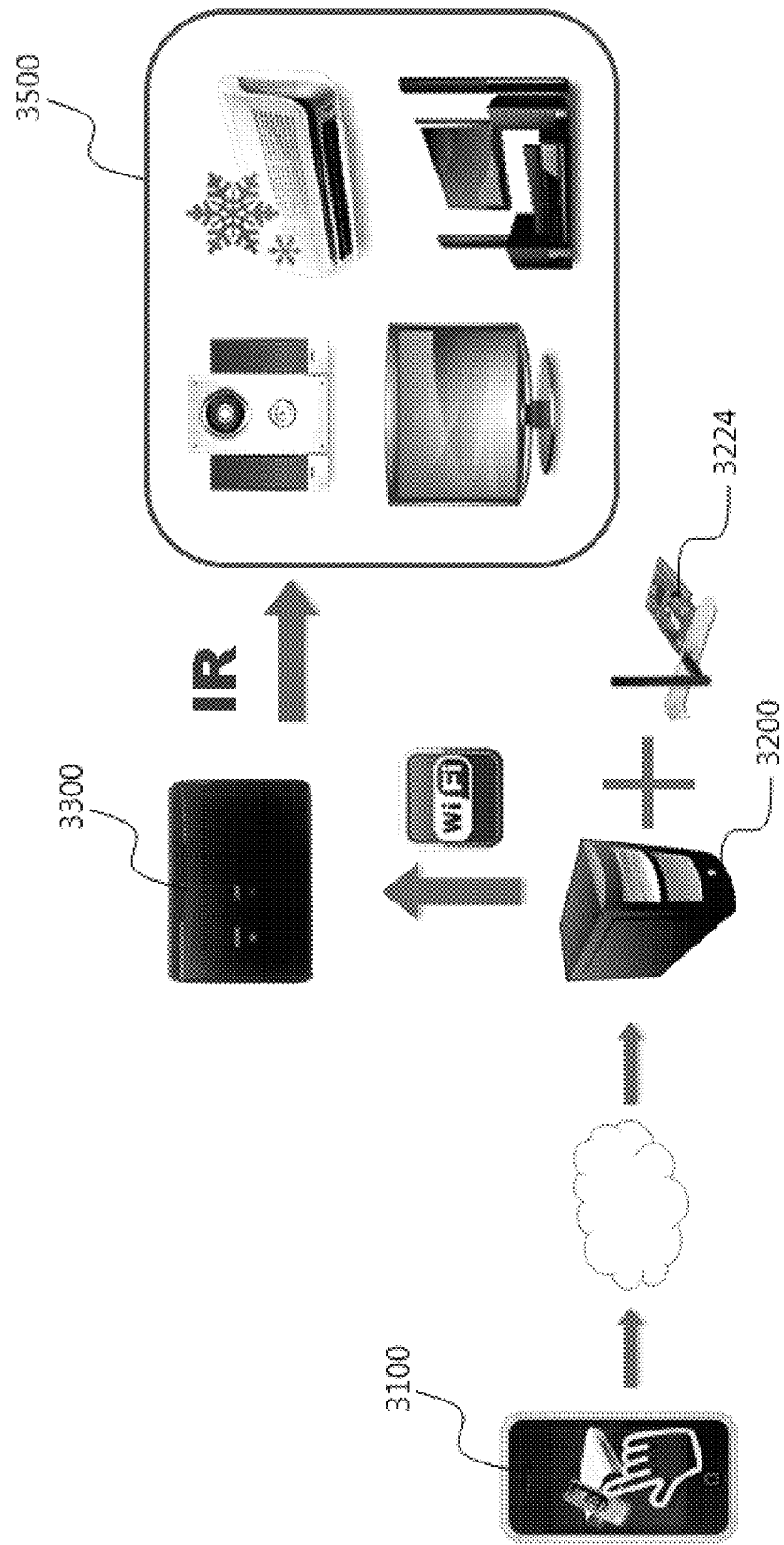
FIG. 20 is a system configuration view showing a fourth implementation example of a digital device control system using a smart phone according to a third embodiment of the present invention.

FIG. 20 is a system configuration view showing a fourth implementation example of a digital device control system capable of learning an infrared signal using a smart phone according to the present invention.

Referring to FIG. 20, the fourth implementation example of the present invention shows an example of controlling an electronic product in a home by activating a digital device control application installed in a smart phone from outside of a room. At this point, in the fourth implementation example, a wireless LAN module capable of performing Wi-Fi communication is provided in the relay home server 3200 as the smart phone communication unit 3210, and a Wi-Fi module 3334 capable of transmitting and receiving data through Wi-Fi communication is provided in the IR repeater 3300.

The driving signal, which is a device control signal for driving an electronic product in a home transmitted from the smart phone, is first received by the wireless LAN module, which is the smart phone communication unit 3210 provided in the relay home server 3200, through Wi-Fi communication. At this point, the relay home server may stably receive the driving signal regardless of changes in the IP address, owing to the DDNS matching unit.

In the relay home server 3200, the wireless LAN module transmits the received driving signal to the IR repeater 3300 through Wi-Fi communication, and in the IR repeater 3300, the Wi-Fi module receives the driving signal transmitted from the smart phone via the relay home server. Then, the IR repeater 3300 creates and transmits an infrared signal appropriate to the corresponding driving signal, and thus home automation can be implemented since operation of an audio system, an air conditioner, a TV or a home theater in the home can be stably controlled even from outside.

Figure 21:
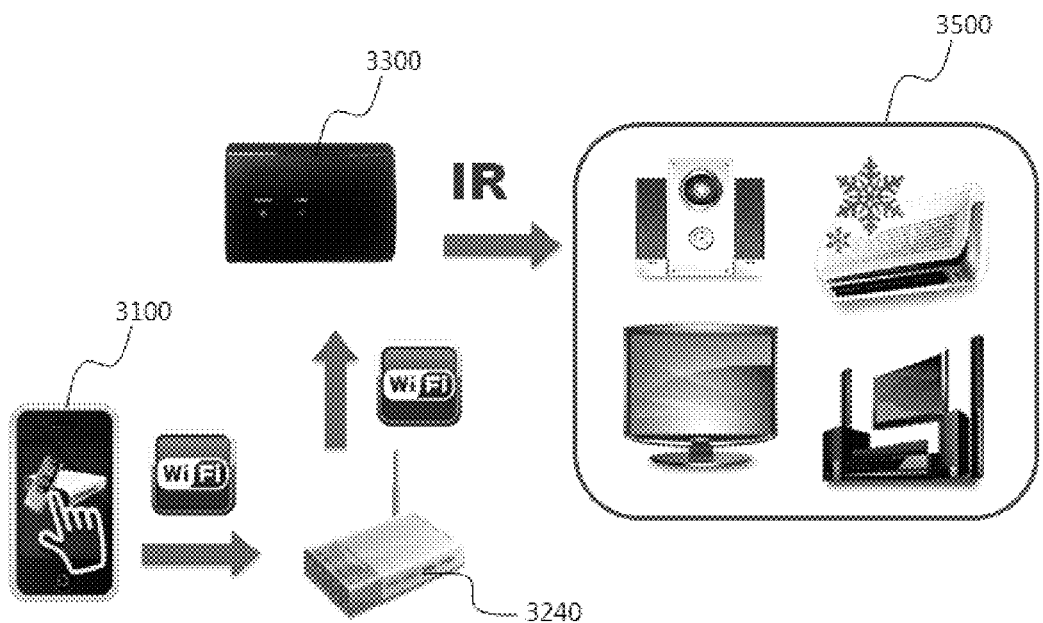
FIG. 21 is a system configuration view showing a fifth implementation example of a digital device control system using a smart phone according to a third embodiment of the present invention.

FIG. 21 is a system configuration view showing a fifth implementation example of a digital device control system capable of learning an infrared signal using a smart phone according to the present invention.

Referring to FIG. 21, the fifth implementation example of the present invention shows an example of controlling an electronic product in a home by activating a digital device control application installed in a smart phone. At this point, in the fifth implementation example, the relay home server is configured as an IP router 3240 capable of performing Wi-Fi communication, and a Wi-Fi module 3334 capable of transmitting and receiving data through Wi-Fi communication is provided in the IR repeater 3300.

The driving signal, which is a device control signal for driving an electronic product in a home, transmitted from the smart phone is first received by the IP router 3240 which forms a local network and is capable of performing Wi-Fi communication and then transmitted to the IR repeater 3300 through Wi-Fi communication.

In the IR repeater 3300, the Wi-Fi module 3334 receives the driving signal transmitted from the smart phone via the IP router 3240. Then, the IR repeater 3300 creates and transmits an infrared signal appropriate to the corresponding driving signal, and thus home automation can be implemented since operation of an audio system, an air conditioner, a TV or a home theater in the home can be stably controlled even from outside.

As described above, since a Bluetooth module or a Wi-Fi module is installed in an IR repeater in which infrared LEDs are installed in a radial pattern, and a relay home server configured of a personal computer and the like located in a home receives a driving signal transmitted directly from a smart phone or from a smart phone placed outside of a room through a 3G network or Wi-Fi communication and transmits the driving signal to the IR repeater through a local network such as Bluetooth or Wi-Fi communication, which forms a local area network within the home, in order to control a digital device, stable home automation may be implemented at a low cost.

Next, a fourth embodiment of a digital device control system using a smart phone according to the present invention will be described with reference to the accompanying drawings. At this point, in the fourth embodiment, since the smart phone is directly connected to the IR repeater in a USB communication method, a communication module is removed from the IR repeater, and thus the IR repeater is easy to carry, and, furthermore, manufacturing cost can be lowered.

Figure 22:
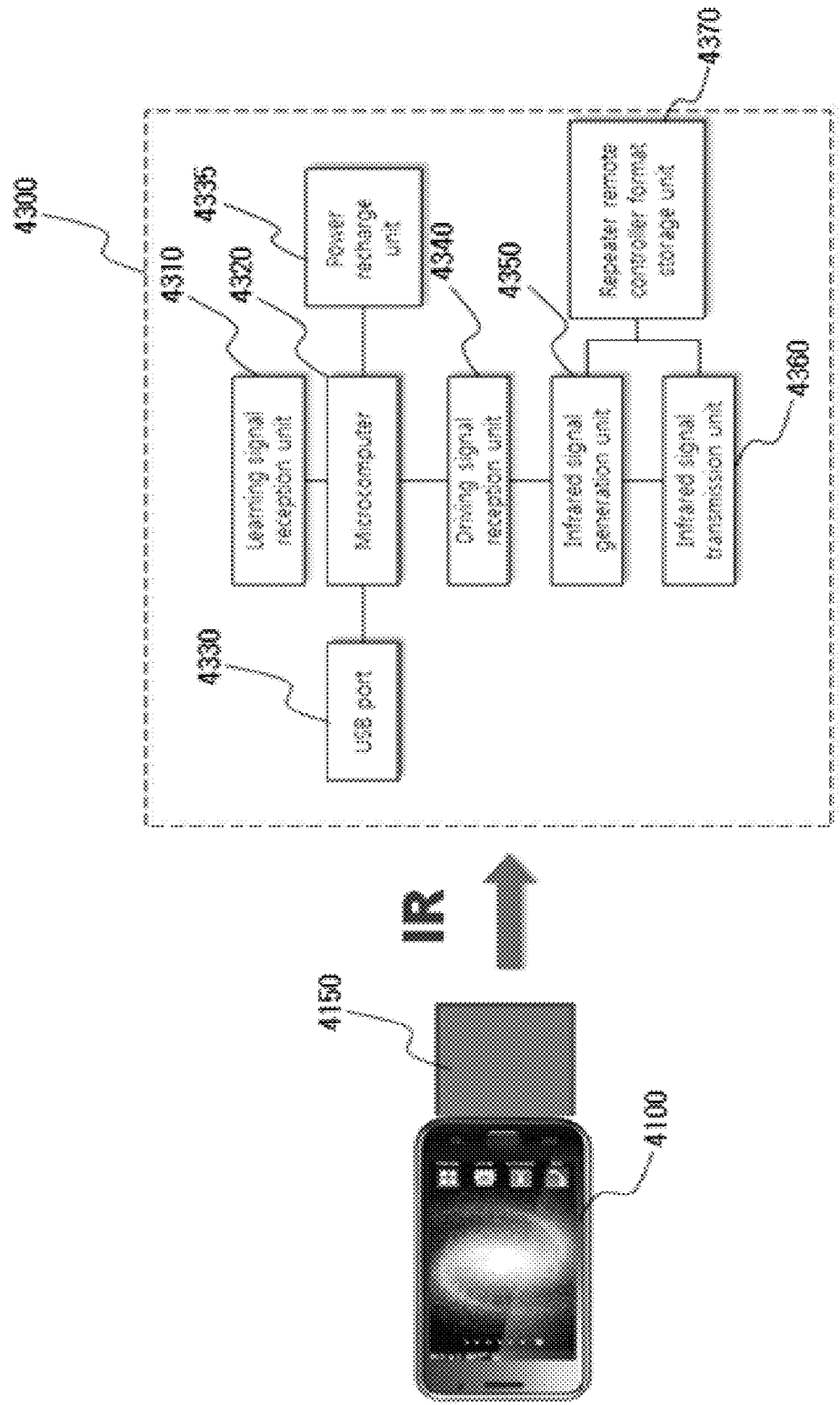
FIG. 22 is a configuration view schematically showing a fourth embodiment of a digital device control system using a smart phone according to the present invention.

FIG. 22 is a configuration view schematically showing a fourth embodiment of a digital device control system using a smart phone according to the present invention.

Referring to FIG. 22, in the fourth embodiment of a digital device control system using a smart phone according to the present invention, a USB port 4330 capable of performing USB communication is formed in the IR repeater 4300, and a USB gender 4150 or a data cable for forming a communication path by connecting the smart phone 4100 and the USB port 4330 provided in the IR repeater is further included.

As described above, since the smart phone 4100 is connected to the IR repeater 4300 through a USB communication method, the IR repeater may receive a driving signal, which is a control command of a digital device created by an smart phone application, through USB communication, analyze the driving signal, create an infrared signal and transmit the infrared signal to each digital device.

Furthermore, since the IR repeater further includes a power recharge unit 4335 capable of being supplied with power for driving the IR repeater through USB communication and storing the supplied power, portability of the IR repeater is improved.

At this point, since the general configuration of the IR repeater except the USB communication unit and the power recharge unit, i.e., a configuration including a learning signal reception unit 4310, a microcomputer 4320, a driving signal reception unit 4340, an infrared signal generation unit 4350, an infrared signal transmission unit 4360, a repeater remote controller format storage unit 4370 and the like, is the same as those of the second and third embodiments, details thereof will be omitted.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

According to the present invention, an application of a smart phone recognizes a drag or a touch on a screen or a voice and transmits a signal to an IR repeater through Bluetooth or Wi-Fi communication so that volume control, channel switch and power on and off of various kinds of digital devices may be remotely controlled, and thus the smart phone can be conveniently used like a remote controller owing to the IR repeater.

The invention claimed is:

1. A digital device control system using a smart phone, the system comprising:
    the smart phone having an application of a remote control function;
    a digital device of which on/off of a power supply, channel or volume is controlled according to an infrared; and
    an IR repeater functioning as a central control unit connected to the smart phone through Bluetooth or Wi-Fi communication and, if a signal of the smart phone is received, transmitting the infrared signal to the digital device, wherein
    the IR repeater includes:
    a communication unit for wirelessly communicating with the smart phone through the Bluetooth or Wi-Fi communication;
    a code storage unit for storing information on an electronic product and a manufacturer corresponding to a custom code;
    a plurality of infrared ray transmission and reception units including a plurality of LEDs for expanding a transmission angle to a range of 60° to 360° and transmitting the infrared signal; and
    a microcomputer for controlling the digital device control system to separate and detect a custom code of the digital device included in the signal of the smart phone received through the communication unit, compare a custom code in the code storage unit with the custom code of the digital device, and transmit the infrared signal for controlling the digital device through the infrared ray transmission and reception unit if the custom codes are matched.

2. The system according to claim 1, wherein the smart phone includes:
    a control unit functioning as a CPU for controlling operation of the smart phone as a whole;
    a memory unit for storing the custom code of the digital device desired to be controlled;
    a communication unit for performing the Bluetooth or Wi-Fi communication with the IR repeater;
    a screen display unit for displaying a manual for controlling the digital device on the smart phone;
    a motion recognition unit for recognizing a motion such as a touch or a drag on a screen of the smart phone; and
    a voice recognition unit for recognizing a voice of a user to control the digital device; wherein
    the control unit controls the screen display unit to provide the manual on the screen and transmits data received from the motion recognition unit and the voice recognition unit and the custom code to the IR repeater through the communication unit.

3. The system according to claim 2, wherein the memory unit stores custom codes of digital devices released by domestic or foreign electronics companies, and if a custom code is not stored when the smart phone is released by a mobile communication company, a custom code of a new digital device is added, updated and stored by connecting to a server of each electronics company and downloading a provided program through the Wi-Fi or Bluetooth communication.

4. A digital device control system using a smart phone capable of learning an infrared signal of a digital device, the system comprising:
 a remote control device provided together with the digital device, for transmitting a control command of a corresponding digital device as the infrared signal;
 an IR repeater provided with a microcomputer for receiving the infrared signal transmitted from the remote control device, capturing the infrared signal and transmitting the infrared signal to the smart phone through a wireless communication unit;
 the smart phone provided with an infrared signal learning unit for receiving the infrared signal transmitted from the IR repeater, matching the infrared signal to a corresponding control command, and storing the infrared signal, wherein
 the IR repeater includes:
 a learning signal reception unit configured as an infrared ray receiver (IR_Receiver) being activated when the IR repeater is set to a learning mode and receiving the infrared signal transmitted from the remote control device;
 a microcomputer functioning as a control unit in charge of general control of the IR repeater and, in addition, capturing and storing the infrared signal as is received by the learning signal reception unit and transmitting the infrared signal to the smart phone; and
 a wireless communication unit configured as a communication module for transmitting and receiving data to and from the smart phone through a wireless communication network.

5. The system according to claim 4, wherein the microcomputer captures and transmits the infrared signal in a form as is integrating a plurality of codes, such as a lead code for activating a digital device desired to be controlled, a custom code which is an address for identifying the digital device, a data code which is a control command of the digital device, and an inverted data code ($\overline{\text{Datacode}}$) inverting the data code.

6. The system according to claim 5, wherein the IR repeater includes:
 a driving signal reception unit for receiving a driving signal of a newly learned digital device transmitted from the smart phone, through the wireless communication unit;
 an infrared signal generation unit for creating an infrared signal corresponding to a custom code of the digital device and a data code, i.e., a control command, which configure the received driving signal; and
 an infrared signal transmission unit for transmitting the infrared signal toward the digital device.

7. The system according to claim 4, wherein the smart phone includes:
 an integrated control driving unit for creating individual driving signals for controlling a plurality of digital devices by a user input;
 an infrared signal learning unit for receiving a captured infrared signal of a new digital device transmitted from the IR repeater in a form as is integrating the plurality of codes which configures the infrared signal;
 an infrared signal storage unit for matching the infrared signal to a control command of a digital device desired to be controlled by the corresponding infrared signal and storing the infrared signal;
 a driving signal creation unit for creating the driving signal of the digital device by handling an input unit displayed on a display means of the smart phone by the integrated control driving unit; and
 a transmitter communication unit capable of performing wireless communication with the IR repeater.

8. The system according to claim 7, wherein the smart phone further includes an interface creation unit for storing the integrated infrared signal as is as a control command and storing a function that will be frequently used by a user to be matched to a separate function button so that a diverse and convenient user interface may be created for each digital device.

9. The system according to claim 8, wherein the smart phone further includes a macro learning unit for consecutively creating driving signals in order to sequentially operate the digital device according to a set value.

10. The system according to claim 9, wherein the macro learning unit creates the driving signals by sequentially changing the data code, i.e., the control command, for the same custom code as a set time is elapsed and transmits the driving signals to the IR repeater so that different control commands may be sequentially executed for the same digital device or the macro learning unit creates the driving signals for activating the digital devices by combining a control command matched to each of the custom code while changing the custom codes of the digital devices as a set time is elapsed and transmits the driving signals to the IR repeater so that the plurality of digital devices may sequentially operate by handling the smart phone only once.

11. The system according to claim 9, wherein a separate timer is provided in the IR repeater, and if the IR repeater receives a macro driving signal transmitted from the smart phone, stores the macro driving signal in the microcomputer, and creates and transmits an infrared signal appropriate to each driving signal of the digital device as a set time is elapsed, operations of the digital device are sequentially performed.

12. A digital device control system using a smart phone, the system comprising:
 the smart phone including a driving signal creation unit for creating a driving signal for controlling a digital device by handling a button displayed on a display means by activating a digital device control application and a driving signal communication unit for transmitting the driving signal of the digital device created by the driving signal creation unit through a wireless communication unit;
 a relay home server for receiving the driving signal transmitted from the smart phone of outside and transmitting the driving signal to an IR repeater installed inside of a room; and
 the IR repeater including a driving signal reception unit for receiving the driving signal transmitted from the smart phone or the relay home server, an infrared signal generation unit for generating an infrared signal corresponding to a custom code and a control command of the digital device, which configure the received driving signal, an infrared signal transmission unit for transmitting the infrared signal toward the digital device, and a wireless communication unit formed as a gateway for receiving the driving signal.

13. The system according to claim 12,
wherein
the relay home server includes a smart phone communication unit configured as a Wi-Fi module for receiving the driving signal transmitted from the smart phone placed outside and a repeater communication unit for transmitting the driving signal received from the smart phone to the IR repeater placed inside;
and/or a Bluetooth module is provided in the IR repeater, and the repeater communication unit is also configured as a Bluetooth module;
and/or a Wi-Fi module is provided in the IR repeater, and the repeater communication unit is also configured as a Wi-Fi module capable of performing Wi-Fi communication.

14. The system according to claim 12, further comprising a format server including:
a smart phone authentication unit for validating an access right to a format database by authenticating a user connected through a wireless communication network;
the format database for storing remote controller formats of digital devices provided by domestic and foreign manufacturers or user interfaces uploaded by users who learn infrared signals and create the user interfaces; and
a format transmission unit for transmitting a remote controller format and a user interface selected by the user to the smart phone of the authenticated user.

15. The system according to claim 14, wherein the smart phone further includes:
an infrared signal learning unit for receiving and storing an infrared signal of a new digital device transmitted from the IR repeater; and
a UI setting unit for forming an interface of a smart phone user for handling a function of a newly learned infrared signal, matching a function of a control command to each of buttons configuring the interface of the user, and storing the interface, and
the IR repeater further includes:
a learning signal reception unit for receiving an infrared signal transmitted from a remote control device of a new digital device; and
a microcomputer for capturing and transmitting the infrared signal received by the learning signal reception unit to the smart phone and receiving and storing an infrared signal transmitted from the smart phone.

16. The system according to claim 15,
wherein
the infrared signal learning unit includes a pattern analysis unit for receiving the infrared signal of the new digital device transmitted after being captured by the IR repeater, analyzing a pattern of the infrared signal, and compressing and storing the infrared signal;
and/or the infrared signal learning unit includes an infrared signal storage unit for storing the captured infrared signal of the new digital device transmitted from the IR repeater, in a form of integrating a lead code, a custom code, a data code and an inverted data code configuring the captured infrared signal, together with a function;
and/or the UI setting unit further includes a sensor recognition unit for matching a handling function of the digital device to information on a movement of the smart phone recognized by an acceleration sensor or a direction sensor provided in the smart phone and storing the handling function in the user interface;
and/or the smart phone further includes a UI transmission unit for creating a gateway which transmits and receives data among smart phones in which a digital device control application is installed and transmitting and receiving the user interface set by a user through the UI setting unit and stored in the smart phone;
and/or the relay home server is configured as an IP router provided with a Wi-Fi module capable of receiving the driving signal transmitted through Wi-Fi communication via a local network;
and/or the infrared signal transmission unit includes a plurality of infrared light emitting diodes arranged on an outer surface of the IR repeater in a radial pattern;
and/or the IR repeater further includes a multiple control processing unit for controlling a plurality of digital devices by sequentially creating and transmitting infrared signals according to the custom code and the data code included in each of driving signals transmitted from a plurality of smart phones.

17. The system according to claim 15, wherein the smart phone further includes a format download unit connected to the format server on the wireless communication network so as to upload an infrared signal pattern of a digital device which is learned and analyzed through the infrared signal learning unit onto the format server through the wireless communication network and download a remote controller format previously uploaded by another user or a digital device manufacturer from the format server.

18. The system according to claim 17, wherein the smart phone further includes a function matching unit for matching a function on the infrared signal pattern, i.e., the remote controller format, downloaded through the format download unit to a display button on the user interface set in the smart phone and storing the remote controller format.

19. The system according to claim 15, wherein the relay home server is configured as a personal computer placed inside of a room and provided with a communication means for receiving the driving signal transmitted from the smart phone placed outside of the room through a 3G network or Wi-Fi communication via a base station.

20. The system according to claim 19, wherein the relay home server includes a DDNS matching unit for implementing a Dynamic Domain Name System (DDNS) service by automatically updating a DNS database whenever a new IP address is allocated by an Internet service provider, by matching a dynamic IP address and a host domain.

* * * * *